United States Patent [19]
Calvert et al.

[11] Patent Number: 5,808,966
[45] Date of Patent: Sep. 15, 1998

[54] SEISMIC ATTRIBUTE ANALYSIS USING INFLECTION POINT INTERVALS

[75] Inventors: Craig S. Calvert, Houston; Vijay Khare, Sugar Land; Kenneth E. Dahlberg, Kingwood, all of Tex.

[73] Assignee: Exxon Production Research Company, Houston, Tex.

[21] Appl. No.: 857,570

[22] Filed: May 16, 1997

Related U.S. Application Data

[62] Division of Ser. No. 422,021, Apr. 13, 1995, Pat. No. 5,691,958.

[51] Int. Cl.$^6$ .............................. G01V 1/30; G06F 15/336
[52] U.S. Cl. ................................ 367/73; 367/25; 364/421
[58] Field of Search .................................. 367/30, 57, 48, 367/73; 364/421, 422

[56] References Cited

U.S. PATENT DOCUMENTS

| | | | |
|---|---|---|---|
| 4,817,062 | 3/1989 | DeBuyl et al. | 367/73 |
| 5,128,866 | 7/1992 | Weakley | 364/421 |
| 5,444,619 | 8/1995 | Hoskins et al. | 364/421 |
| 5,457,541 | 10/1995 | Burns | 358/298 |
| 5,691,958 | 11/1997 | Calvert et al. | 367/73 |

FOREIGN PATENT DOCUMENTS 9632656  10/1996  WIPO .

OTHER PUBLICATIONS

Litvinov, A. Y. and Vugman, Z. M.; "Forecasting of the Geological Section of the North Helez Oil–Field Using the RECOSEIS System", unpublished document form, the Golan Initiative Center, May 1993.

Sibley et al., 4th Annual SPE et al. Archie Conference, Nov. 1, 1993, Proc., p. 141.

Burgis, W. A., 65th Annual SEG Meeting, Oct. 18, 1995, Paper SS3.3, p. 1522.

Ronen, et al., 54th EAEG Meeting, pp. 18–19, Jun. 1, 1992.

Ismail et al, SPE Asia Pacific Oil & Gas Conf., Apr. 16, 1997, pp. 493–502; abst. only herewith.

*Primary Examiner*—Nelson Moskowitz

[57] ABSTRACT

A method of geophysical prospecting using seismic trace attribute analysis for formation characterization. More particularly, a method for selection of seismic traces which most accurately represent the subsurface formation in the area of a seismic survey is disclosed. In one embodiment, inflection-point interval analysis is used to account for effects of local surfaces.

9 Claims, 20 Drawing Sheets

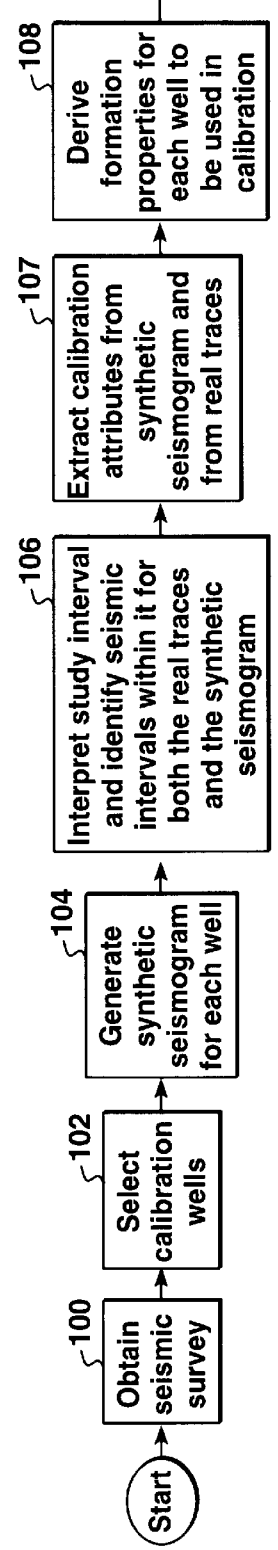

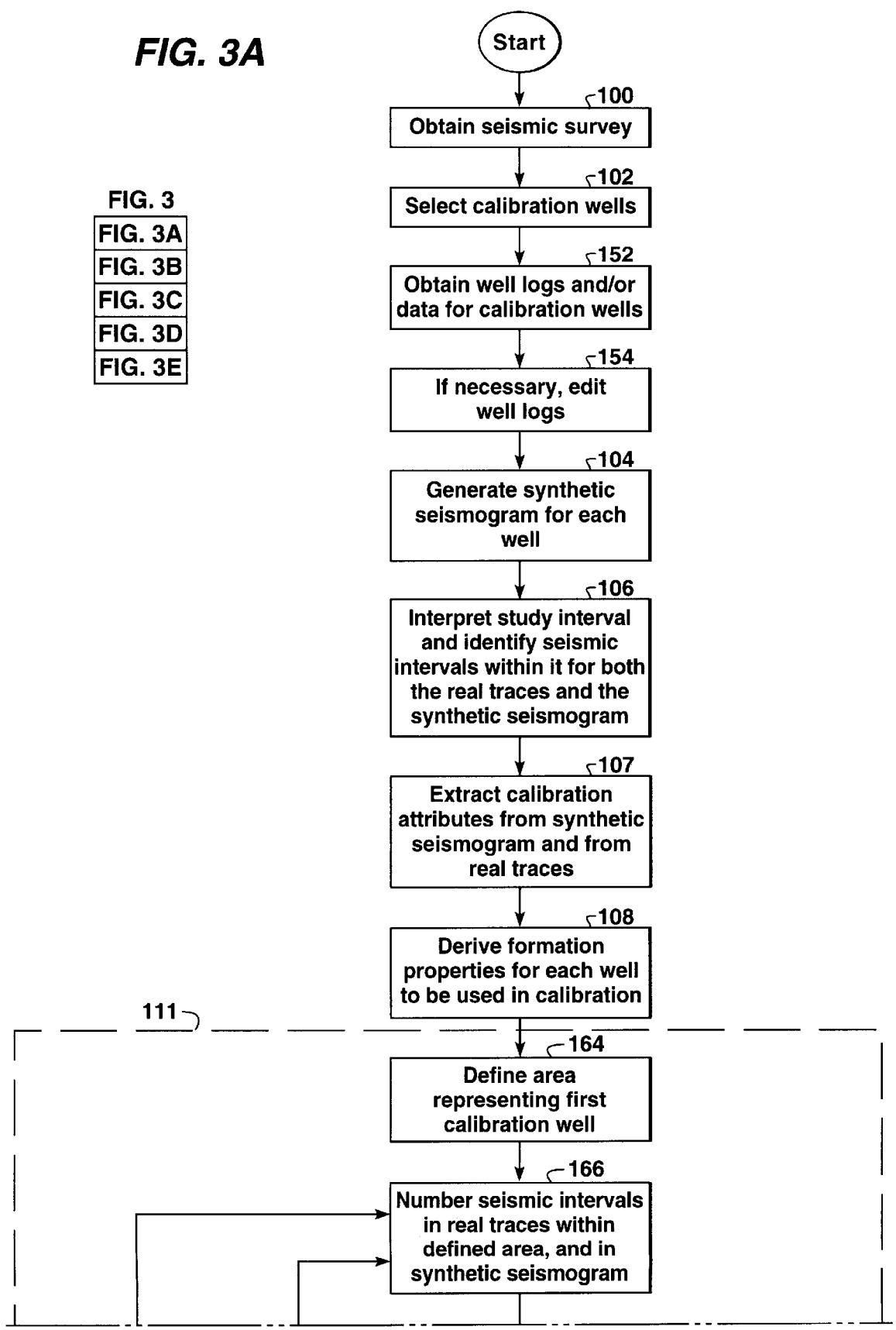

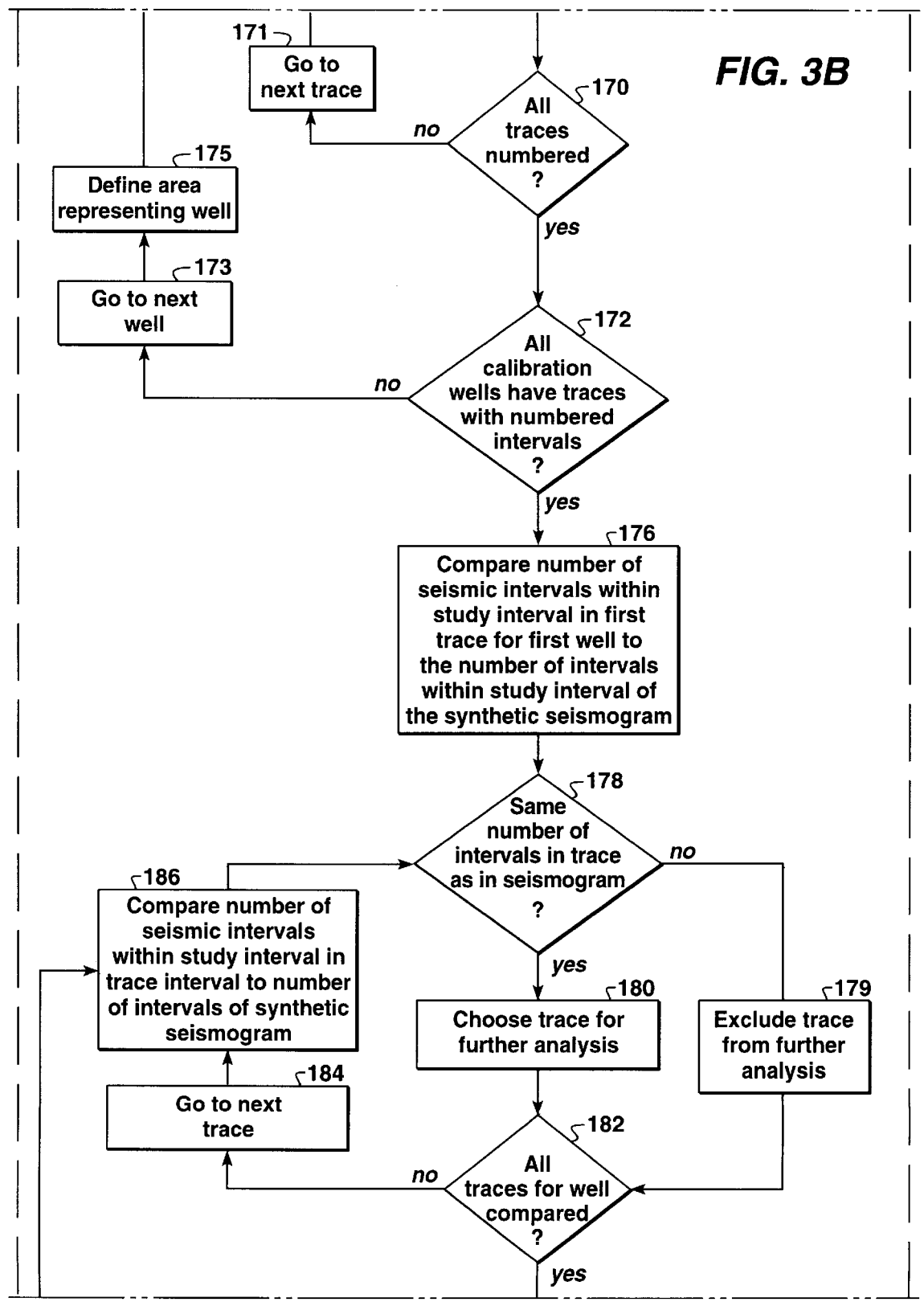

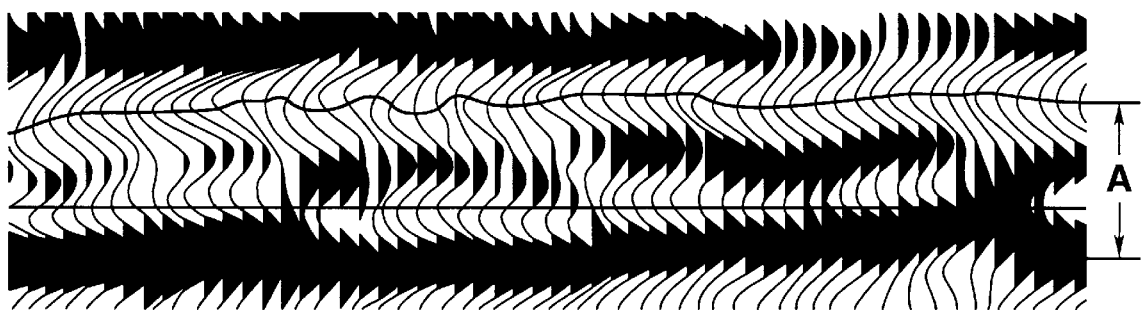
FIG. 4
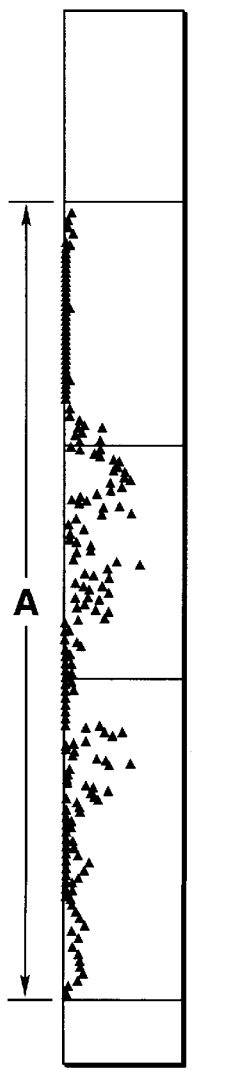 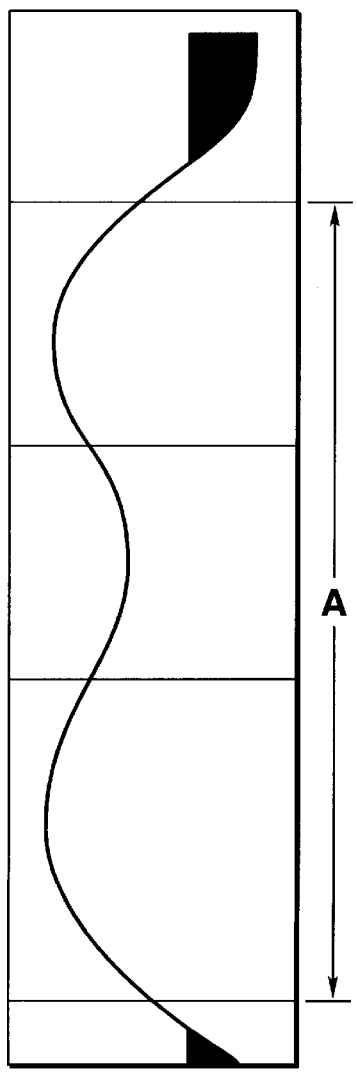 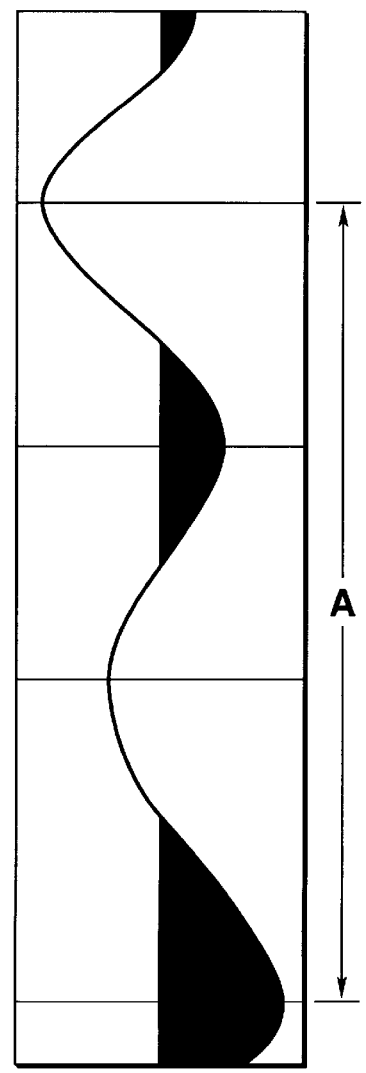
FIG. 5A  FIG. 5B  FIG. 5C

▓▓▓ GOOD TIE TO SYNTHETIC
▓▓▓ POOR TIE TO SYNTHETIC

>7% Porosity   3-5% Porosity
5-7% Porosity   <3% Porosity

>7% Porosity   3-5% Porosity
5-7% Porosity   <3% Porosity

|////| >7% Porosity   |///| 3-5% Porosity
|\\\\| 5-7% Porosity  |XXX| <3% Porosity

|////| >7% Porosity   |///| 3-5% Porosity
|\\\\| 5-7% Porosity  |XXX| <3% Porosity

SEISMIC ATTRIBUTE ANALYSIS USING INFLECTION POINT INTERVALS

This application is a divisional of prior application Ser. No. 08/422,021 filed Apr. 13, 1995, now U.S. Pat. No. 5,691,958.

FIELD OF THE INVENTION

This invention deals with geophysical prospecting. More particularly, this invention is a method of characterizing the properties of the formations comprising the earth's subsurface.

BACKGROUND OF THE INVENTION

In the ongoing search for subsurface hydrocarbons, geophysicists have developed methods for evaluating and interpreting the structure and characteristics of the earth's subsurface. Of particular importance is the ascertainment of formation characteristics consistent with the presence of hydrocarbon deposits. Where seismic traces can be used to predict such subsurface rock properties as lithology, porosity and pore fluid content, the ascertainment of such formation characteristics is simplified.

The seismic traces that are analyzed using the method of the within invention are obtained by any conventional means. One of ordinary skill in the art would understand that seismic traces are usually obtained by the reflection of acoustic waves from geologic layers of differing acoustic impedance. Acoustic impedance is dictated by the physical properties of the material through which the acoustic wave travels; such properties include porosity, lithology, and fluid content.

As stated, seismic data are generally obtained by imparting seismic energy into the earth, then receiving and recording the energy reflected by the subsurface formations. This received energy is then processed to produce seismic signals or traces, which depict reflection information as a function of the time lapse from signal generation to reception and the embedded seismic pulse. As is known to those of ordinary skill in the art, processing of the seismic data may vary, but typically includes stacking, migration, and deconvolution.

Originally, seismic traces were used simply for ascertaining formation structure. However, in 1979, Taner et al. published the seminal work, "Complex Seismic Trace Analysis," Geophysics, Volume 44, pp. 1041–1063. Beginning with that article, exploration geophysicists have developed a plurality of time-series transformations of seismic traces to obtain a variety of characteristics that describe said traces; such characteristics have been termed "instantaneous attributes." These attributes provide quantitative measures of the wave-like nature of the seismic signals comprising the seismic traces. Such attributes are said to be "instantaneous" because values for the attributes are generally obtained for each time sample point in the seismic data or within a small time window of data points (e.g., a few milliseconds). Examples of instantaneous attributes include, but are not limited to, amplitude, phase, frequency, dip, power, etc. There are literally more than one hundred different kinds of attributes. By overlaying such instantaneous attributes on displays of seismic data, explorationists have employed such instantaneous attributes to characterize and identify changes in lithology, geology, porosity and pore fluid content associated with individual reflection events in the seismic data. Seismic attributes in general, not limited to instantaneous attributes, may also be so used. As used herein, the term "attribute" includes any and all means of characterizing a seismic signal or trace, including, by way of example but not for purposes of limitation, frequency, amplitude, and phase. Frequently in the art, "interval" attributes are analyzed. Interval attributes are the attributes of a seismic trace within a seismic interval, such as average or maximum residual impedance, a measure of the resistance of a seismic interval to the passage of the seismic signal. These terms are familiar to those skilled in the art of attribute analysis.

Analysis of seismic response associated with reflection events in the seismic data is generally referred to as stratigraphic interpretation or analysis.

Despite recent advances in the technology, stratigraphic interpretation or analysis of seismic data still depends primarily upon the extraction of qualitative information from the seismic data by an interpreter. Additionally, the sheer number of instantaneous attributes obtained from the seismic data can overwhelm the explorationist with quantitative measures of variations in the earth's formations represented by reflection events in the seismic signals comprising the seismic data. Moreover, the use of instantaneous attributes as descriptors of formation materials at a particular depth can be misleading because of the long wavelength nature of seismic energy. That is, individual reflection events, and therefore instantaneous attributes in turn, in fact do not represent the properties of the earth at a particular specific depth, but actually can and do represent the properties of tens of feet of formation materials on either side of that specific depth due to seismic wavelengths which are typically on the order of 200 to 600 feet. For all of these reasons, explorationists often fail to identify and characterize subtle changes in the formations' lithology, geology and pore fluid content as represented in conventional displays of instantaneous attributes. Examples of instantaneous attribute technology are proposed by Quay et al. in U.S. Pat. No. 3,899,768 and Bodine in U.S. Pat. No. 4,779,237.

The sheer number of instantaneous attributes involved in early stratigraphic analysis created serious limitations on the usefulness of such techniques. As this technology matured, methods of reducing this volume were proposed.

In U.S. Pat. No. 4,633,447 to Bodine, a technique for choosing which one instantaneous attribute to use for representing an entire wavelet or reflection event is proposed. The goal of reducing the number of instantaneous attributes was accomplished therein by the creation of a display of attributes which characterized differences in adjacent formations represented by each reflection event. Additionally, limitations in the quality of the seismic data, the information conveyed by individual reflection events, and hence the instantaneous attributes, within a stratum can fail to provide an accurate description of changes in the lithology, geology, porosity or pore fluid content thereof; therefore, it is unlikely that one instantaneous attribute would be appropriate for formation characterization throughout a given survey.

Bahorich et al., in U.S. Pat. No. 5,226,019, described a method which is used to overcome some of the early difficulties encountered in the area of stratigraphic analysis. This method involves defining a stratum of the earth's subsurface on the seismic data, that is, the portion of the subsurface between two reflection events, then transforming the instantaneous attributes within that stratum into a single descriptor statistically representative of the formation materials comprising the stratum in the earth's subsurface. These descriptors associated with each stratum are then optionally plotted to identify and characterize lateral variations in the lithology, geology, porosity and pore fluid content of the formation materials comprising the stratum. These attributes are referred to hereinafter as "interval attributes."

The objectives of seismic attribute analysis, then, include (1) identifying the surfaces which bound the geologic intervals of differing acoustic impedance, and (2) assigning characteristic values, which values may exhibit lateral variations, for the physical rock properties within each of these geologic intervals.

There are two key steps used in the art to assign these characteristic values for the physical rock properties. The first step is a seismic-to-synthetic well tie, which compares the identified surfaces and interval attributes (e.g., amplitude) identified on at least one seismic trace at or near a well location with those identified in a synthetic seismogram which is developed for that well, the well being termed herein a "calibration well." This synthetic seismogram is generated using well log data and/or core data, coupled with standard techniques familiar to those skilled in the art. The second step is termed "well calibration," which involves statistically relating (e.g., by linear regression or any other statistical technique) the attributes obtained from traces that are presumed to represent the formation properties at a well for any seismic interval, with the rock properties in that well over that same interval (e.g., the average of the property, such as porosity, or the frequency of the property, such as how often sand occurs as opposed to other lithologies in the interval). Thus, a seismic-to-synthetic well tie relates a real trace to a synthetic seismogram, while calibration relates a real trace to actual rock properties as determined by the well log and/or core data. The synthetic seismogram was derived from the rock properties as determined by the well log, using a seismic pulse derived from seismic data, and, if derived properly, according to methods familiar to those skilled in the art, is considered in the art to be an accurate seismic representation of the well as measured.

In seismic attribute analysis, one step in the process of calibrating seismic attributes to physical rock properties involves the selection of seismic traces to represent each calibration well. Seismic attributes are then extracted from these selected representative traces and statistically related to the well's physical rock properties via the calibration step. Mathematical models are developed to characterize the relationships, and these models are employed on traces throughout the survey to predict rock properties.

While these methods are equally applicable to two-dimensional seismic data sets, they are particularly helpful with three-dimensional (hereinafter "3D") seismic data sets, where each well used for seismic-attribute calibration could have many tens of traces within a several-hundred-foot radius of it. Because of this large number, the task of selecting traces to represent the well is often simplified in the art by assuming that those traces in close proximity to the well are most representative.

Trace selection for the purpose of seismic attribute calibration is not generally addressed in the published literature, but it is believed that most practitioners of the art select traces based on their proximity to the well by assuming either (1) the single trace closest to the well is most representative, or (2) all traces within a defined radius of the well are most representative. However, there are two fallacies in these assumptions. First, not all traces in proximity to the well are necessarily representative of its geology because geology, and therefore seismic character and rock properties, can change rapidly over short distances. Second, not all traces are necessarily of equally good data quality. Therefore, the process of selecting traces must consider not just proximity to the well, but also how well the trace represents the geology penetrated by the well, which will be referred to herein as "well tie criteria."

Existing seismic-to-synthetic well tie methods are often tedious to implement, qualitative, and/or subjective. In addition, they are not designed to assess the well tie for the specific purpose of seismic attribute calibration; the assessment must be based on more general criteria. Therefore, there is a need for an automated, quantitative, and objective method to select traces for seismic attribute calibration which considers proximity, geologic properties and calibration-specific criteria.

Visual seismic-to-synthetic well ties are commonly made by stratigraphers when interpreting seismic data. However, a visual trace selection method for calibration is tedious, qualitative, subjective, possibly applies nonuniform criteria, and assumes that the human eye can define the criteria useful to assess a well tie for the purpose of calibrating seismic attributes to rock properties.

A commonly used method in the art for assessing the seismic-to-synthetic well tie relies on a single, cross-correlation measure between real traces and synthetic seismograms over a study interval of interest. Advantages of using this method are that it is both objective and quantitative. However, assessing the seismic-to-synthetic well tie for numerous individual traces in proximity to several calibration wells would be a tedious process. In addition, this method is very sensitive to all differences in trace characteristics, even those characteristics which are not correlated with the rock properties of interest.

For example, suppose average or maximum residual impedance within seismic intervals (just two of many measurable seismic interval attributes) correlates with average porosity in those intervals. However, this average porosity is not dependent on the thicknesses of those intervals. In this example, the seismic-to-synthetic well tie measure derived using this single cross-correlation method would be sensitive to differences in both the average or maximum residual impedance and the interval thickness. As a result, traces with seismic intervals having average or maximum residual impedance values very similar to the synthetic seismogram could be found to tie poorly using this method, for the simple reason that the thicknesses of the seismic intervals in these traces don't match those in the synthetic seismogram. For the purpose of selecting traces for calibration, then, this cross-correlation method is inappropriate for use in assessing the seismic-to-synthetic well tie.

As more fully described below, a further problem, beyond trace selection, encountered with seismic-attribute analysis has to do with the effects of what are termed herein "local surfaces," that is, reflectors imbedded within the study interval, which reflectors do not extend essentially the full length of the stratum, and which an interpreter could not correlate with a high degree of confidence. Therefore, local surfaces do not include, for example, pinch outs, which are terminations of beds which thin gradually.

In this regard, conventional seismic attribute analysis methods have two general limitations. First, the surfaces that bound geologic intervals of differing impedance are defined as those surfaces which can be correlated with confidence by the seismic interpreter throughout the entire 2D or 3D seismic data set. Local surfaces that cannot be correlated are not identified, and local changes in rock properties at these surfaces go unrecognized. As a result, the vertical resolution of the assigned rock properties is, at best, equal to the dimension of that seismic interval which can be interpreted, that is, which has correlated bounding surfaces. Second, because these interpreted intervals may contain internal, local surfaces which cannot be correlated, assigning average rock properties to these intervals becomes a complex problem since each "subinterval" may exhibit different rock properties.

The conventional solution to the problem of local surfaces involves extraction of many seismic attributes, each measuring a different characteristic of the complex trace segment, and statistical correlation of these attributes (singly and in different combinations) to the interval-averaged rock properties. This statistical analysis is termed "seismic attribute calibration," and the result is a model which is used to transform the extracted attribute or attributes to average rock properties within the interpreted interval throughout the 3D seismic data cube.

There is therefore a need in the art of seismic attribute analysis for an improved method for determining formation characteristics from seismic attributes.

SUMMARY OF THE INVENTION

Disclosed herein is a method for determining formation properties for a preselected subsurface formation comprising: a) obtaining a seismic survey, comprised of seismic traces, of a portion of the earth's subsurface; b) locating a calibration well preferably located in said portion of the earth's surface; c) generating a synthetic seismogram for said well; d) selecting traces which acceptably approximate said synthetic seismogram; and e) using said selected traces to predict formation properties for at least some of said portion of the earth's subsurface.

In one embodiment, a portion or all of these calculations are performed by electronic means, such as a calculator or a computer.

In another embodiment, the effect of local surfaces is accounted for by: first, capturing what is termed herein "inflection-point interval formation properties" from the well logs or core data; second, selecting seismic traces which acceptably approximate a synthetic seismogram developed from the well logs or core data; third, extracting seismic attributes within each "inflection point interval" and calibrating these attributes to the rock properties; and, fourth, applying the calibration model to the entire seismic data survey. "Inflection-point intervals" are defined as intervals bounded by inflection points on a seismic trace, and in one embodiment, these intervals are located on a residual impedance or total impedance seismic trace. (As is well known to those of ordinary skill in the art, impedance is the product of density of the earth and the acoustic velocity, while residual impedance is the impedance filtered to the frequency band width of the seismic data.) Inflection point intervals represent the thinnest intervals that can be detected in the seismic data, and, therefore, the thinnest intervals that can be assigned average rock properties. Inflection points are defined as the sample or interpolated sample points on a residual impedance or total impedance seismic trace where the trace curvature changes from being concave right to concave left, or vice versa. As is known by those of ordinary skill in the art, a total impedance seismic trace can be calculated by mathematically adding a low frequency impedance trend derived from well impedance data to the residual impedance trace. Addition of the low frequency impedance trend can be achieved by many means familiar to those skilled in the art. An "inflection-point interval" is defined herein to be a seismic interval between two inflection points on a seismic trace, as distinguished from seismic intervals between correlated subsurface horizons; and "inflection-point interval average" is a single descriptor but of an attribute for said inflection-point interval rather than for a defined stratum.

BRIEF DESCRIPTION OF THE DRAWINGS

FIGS. 2A, 2B and 2C collectively present a more detailed flowchart of the general trace selection method disclosed herein.

FIGS. 3A, 3B, 3C, 3D and 3E collectively present a flowchart of one embodiment of the trace selection method disclosed herein.

FIG. 4 shows a zero-phase amplitude seismic section in the area analyzed in EXAMPLES 1 and 2, infra.

FIG. 5A depicts core plug porosity values for a calibration well in EXAMPLE 1 and 2, infra. Similarly, FIG. 5B depicts a residual impedance synthetic seismogram and FIG. 5C depicts a zero-phase amplitude synthetic seismogram for the same calibration well. In each of these three FIGURES, each horizontal line marks an inflection point.

In FIG. 11A, traces identified as representing the synthetic seismogram, with RMS<4500, were used. In FIG. 11B, all traces within a three-trace radius of the well were used. The linear model plotted in FIG. 11A is that used in calibration to transform the inflection-point interval average residual impedance attribute to inflection-point interval average porosity. No such meaningful model could be generated for the data shown in FIG. 11B.

DESCRIPTION OF THE PREFERRED EMBODIMENTS

Figure 1:
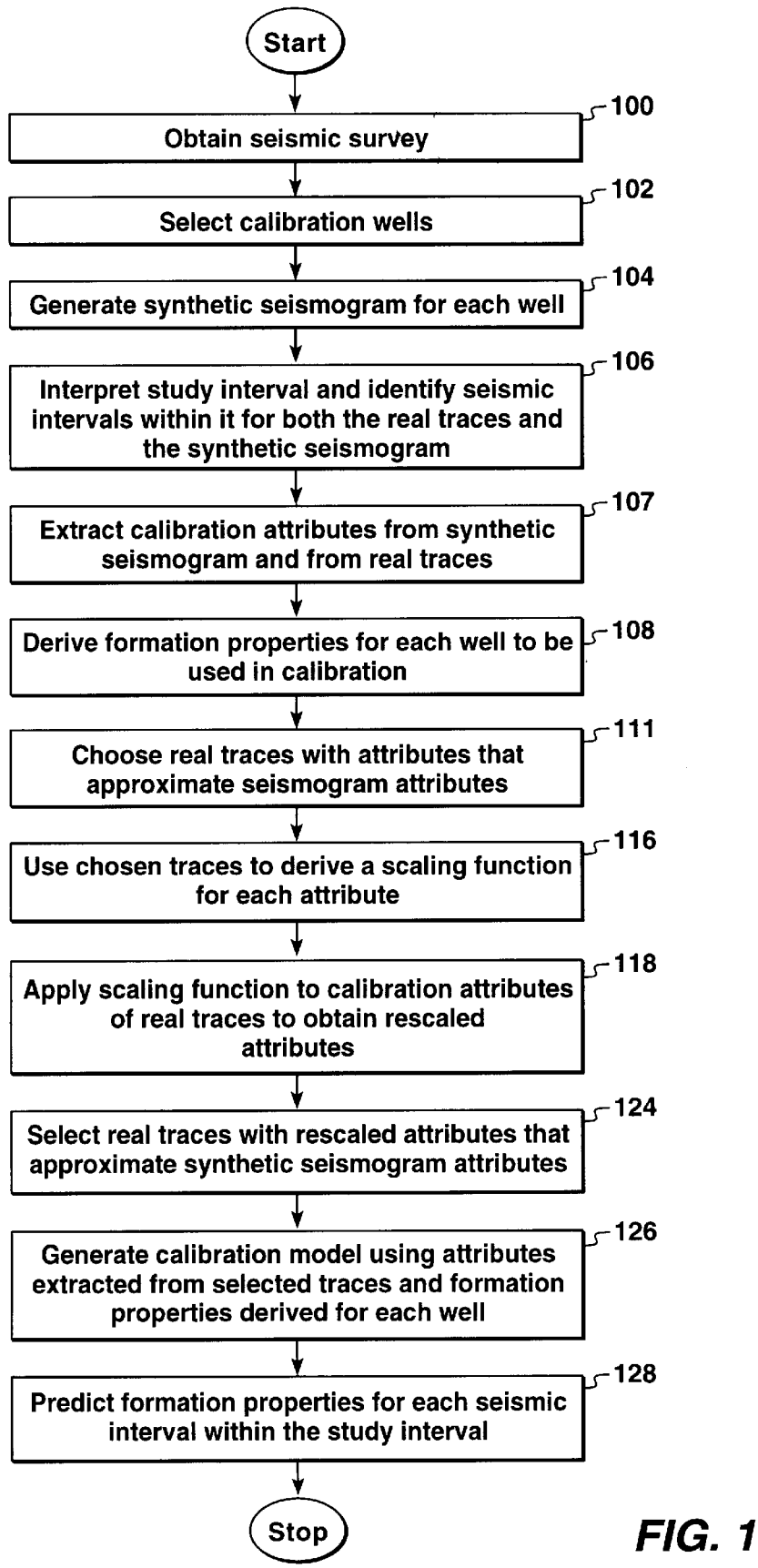
FIG. 1 is an overview flowchart of a method for predicting formation properties using the trace selection method disclosed herein.

The trace selection aspect of this invention is set forth in flowchart form in FIG. 1 hereto.

First, in step 100 a seismic survey must be obtained. At least one calibration well must be chosen 102. In one embodiment, the calibration well is located in the area covered by the seismic survey. However, calibration wells external to the chosen area and even completely outside the seismic survey have also been used successfully, particularly where independent data support the assumption that the geology of the formation at the well is representative of the geology at the area covered by the seismic survey. Types of such independent data are well known to those of ordinary skill in the art. A synthetic seismogram which effectively predicts what a seismic trace representing the well should look like is generated 104 using any of a number of techniques available in the art. In step 106, the study interval is interpreted and seismic intervals within it identified for both the traces from the seismic survey (hereinafter the "real traces") and the synthetic seismogram. As used herein, the term "seismic interval" can mean an interval between two correlated reflectors, an inflection-point interval, an interval between two seismic times, an interval between two depths, or any interval of seismic data determined in any other way understood in the art. In one embodiment, inflection-point intervals are used. Calibration attributes are then extracted 107 from the synthetic seismogram and from the real traces. The seismic attributes selected to be extracted are those attributes which have been selected for calibration. As is known in the art, various methods can be used to identify these attributes, including, but not limited to, forward seismic modeling. One embodiment of the method of this invention relies on regression to develop the model used to rescale the real seismic attributes, hereinafter termed the "scaling function." Regression analysis is a mathematical technique well known to persons of ordinary skill in the art and, accordingly, will not be described in detail herein. In one embodiment the real traces from which the attributes are extracted are near the calibration well. However, it has been determined through experimentation that the traces need not neighbor the well, but may come from anywhere in the seismic survey, as long as they acceptably approximate the synthetic seismogram. This is particularly obvious where the well itself is not within the survey.

Formation properties to be used in calibration are derived 108 from each well. Real traces are then chosen 111 to approximate the seismogram generated. These chosen traces are then used in deriving 116 a scaling function for each attribute. This scaling function is applied to the calibration attributes extracted from the real traces to produce calibration attributes rescaled to those of the synthetic seismogram 118. Those traces with rescaled attributes which acceptably approximate the attributes of the synthetic seismogram are then selected 124 for calibration. The attributes extracted from these selected traces and the formation properties derived for each well are then used to generate 126 a calibration model. Finally, the formation properties for each seismic interval within the study interval are predicted 128.

Figure 2B:
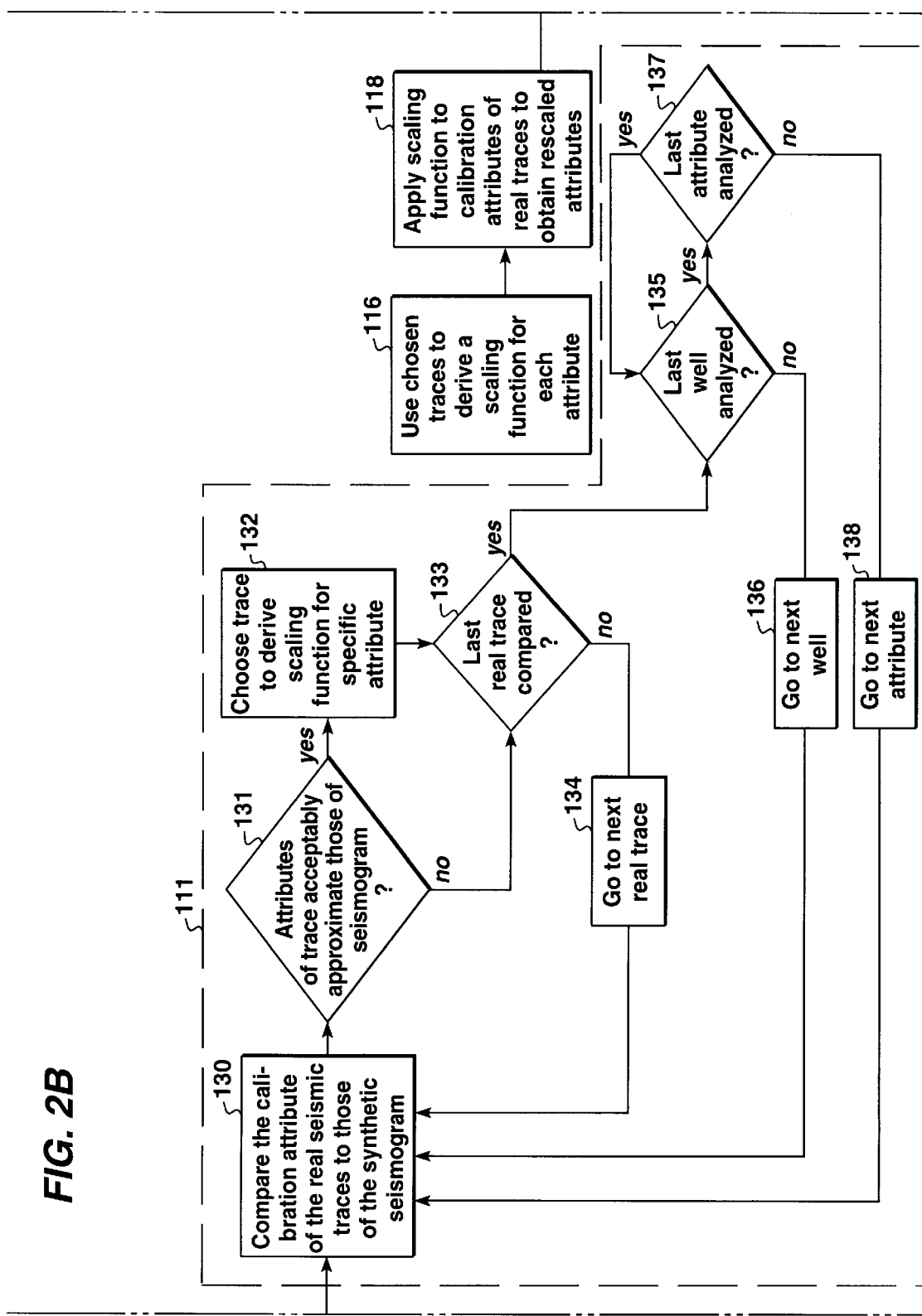
Figure 2C:
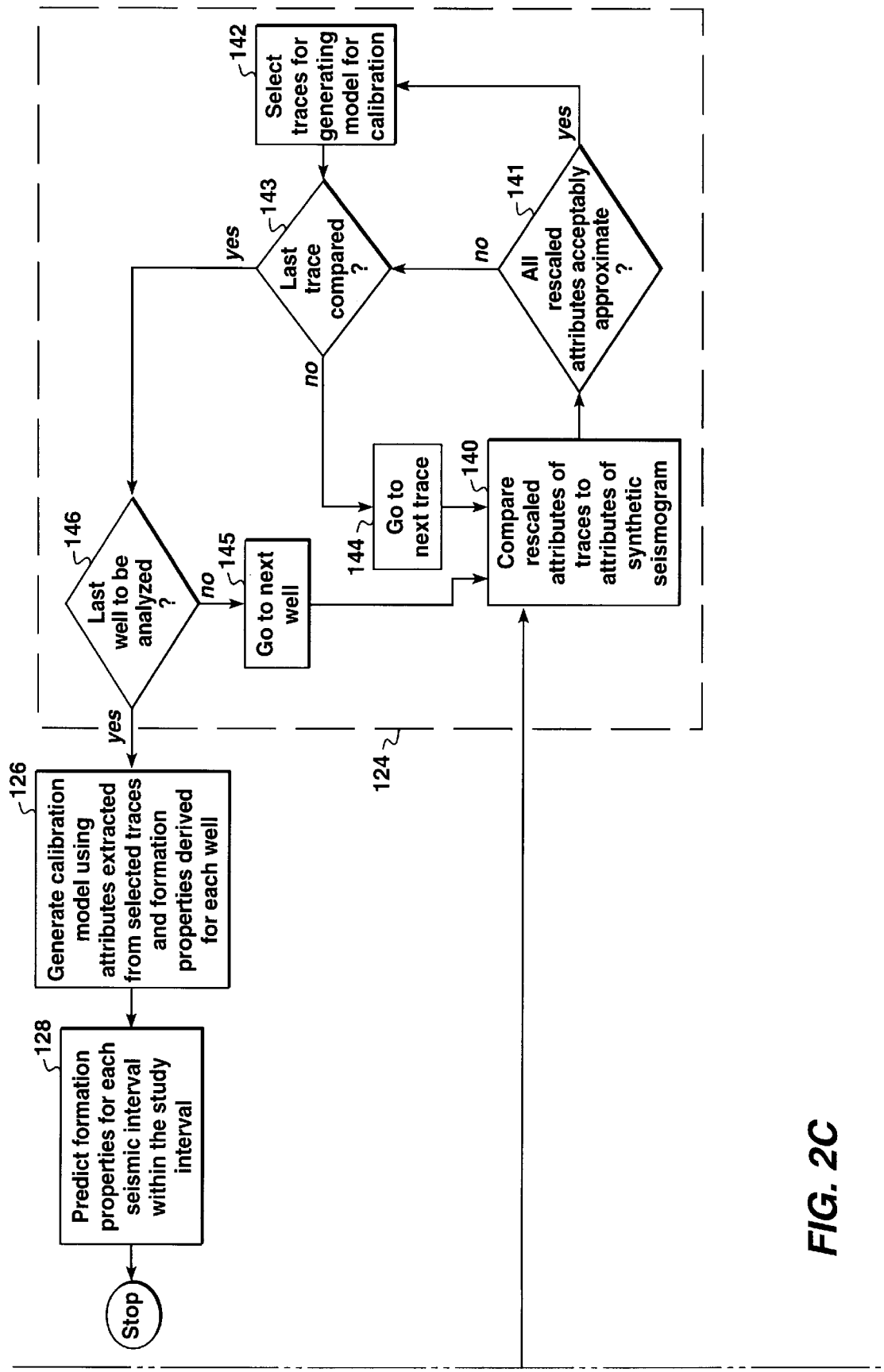

More details of steps 111 and 124 are presented in FIGS. 2A, 2B and 2C. Referring to FIG. 2B, step 111, choosing real traces with attributes which approximate the synthetic seismogram attributes, is exploded into steps 130–138. Each calibration attribute from the real seismic traces in the survey, are compared 130 to those of the synthetic seismogram. Where a calibration attribute from a real trace acceptably approximates 131, as discussed in further detail infra, the corresponding calibration attribute for the synthetic seismogram, said real trace is chosen 132 for use in generating a scaling function for that attribute. When all traces, as required by step 134, desired to be compared have been compared 133, all wells have been analyzed 135, as required by step 136, and all attributes have been analyzed 137, as required by step 138, a scaling function is developed for each attribute using said chosen real traces 116.

Step 124 is exploded into steps 140–146 in FIG. 2C. The rescaled attributes are compared 140 to the corresponding attributes of the synthetic seismogram, and those traces with all rescaled attributes which acceptably approximate 141 those attributes of the synthetic seismogram are selected 142 for calibration. When all the traces desired to be compared for a well are compared 143, as ensured by step 144, and all wells are analyzed 146, as ensured by step 145, a calibration model is generated using well formation properties and the calibration attributes extracted 126 from said selected traces. The rock properties are then predicted 128 by applying said calibration model to all seismic intervals within all seismic traces in the desired portion of the seismic survey.

Another embodiment is set forth in FIG. 3.

FIGS. 3A, 3B, 3C, 3D and 3E present an even more detailed version of both steps 111 and 124, and also adds a detailed version of step 118.

FIG. 3A also adds steps 152 and 154. After obtaining 100 a seismic survey, calibration wells must be selected 102. Well logs and/or core data of each of the calibration wells must be obtained 152. The map locations of each of the calibration wells at the depth of the study interval must be known if traces proximate to the well are to be selected. If necessary, well logs must be edited 154 using techniques known to those of ordinary skill in the art to insure the accuracy of the formation properties to be derived therefrom. It is desirable that the synthetic seismograms accurately represent the density and acoustic velocity measures of the formation at the well within the study interval and within many tens of feet both above and below the study interval; any inaccuracy here may be reflected in the models later derived, and result in lower correlations than otherwise possible.

Figure 3C:
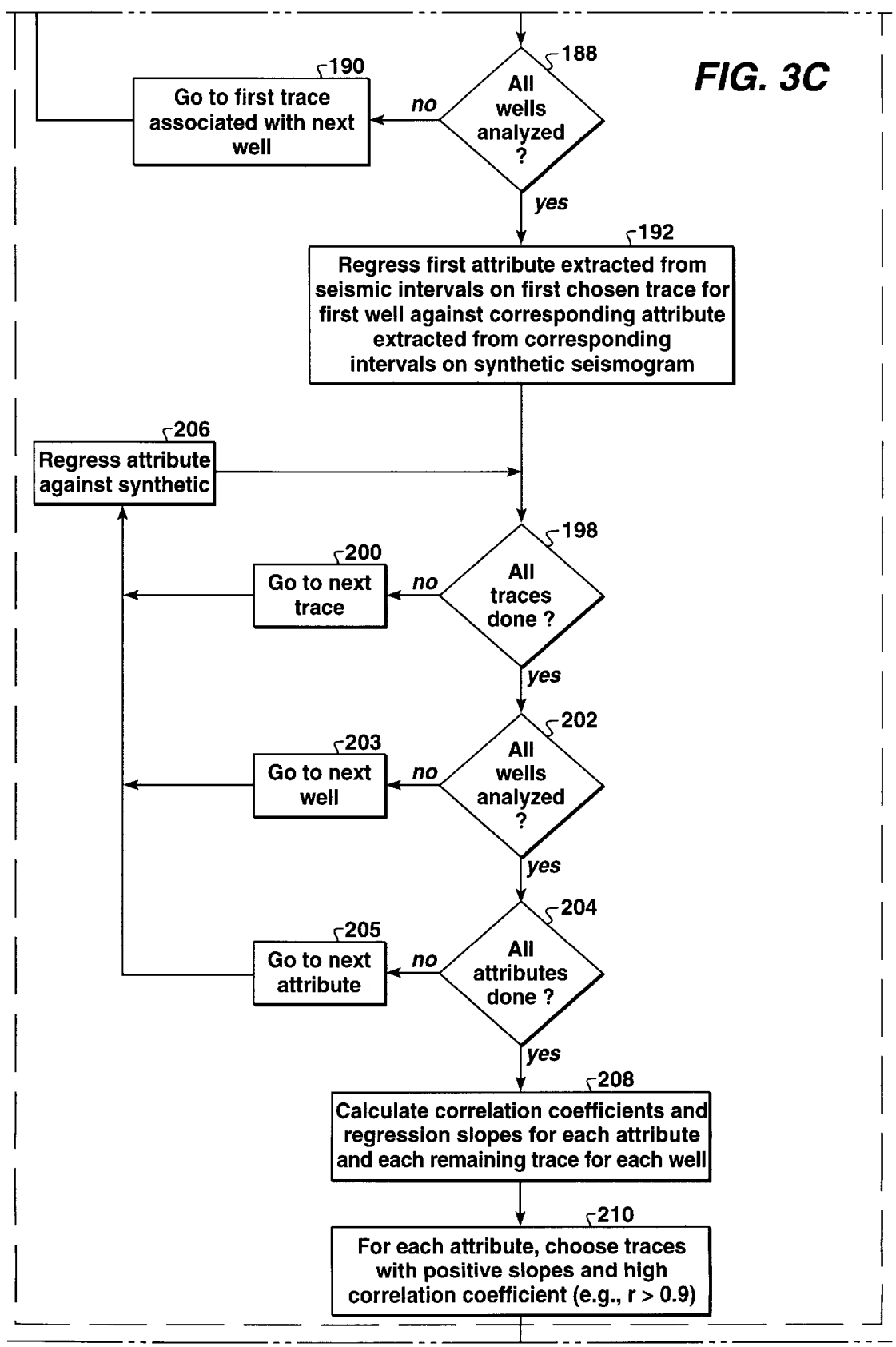

FIGS. 3A, 3B, and 3C present the expanded version of step 111, in steps 164–210.

The purpose of this step 111 is to assess the real traces. In one embodiment, real traces are compared to the synthetic seismogram corresponding to a well. (For the sake of simplicity in this disclosure, we will discuss the use of a "radius" around each well, defining a circle, all traces within which are considered to potentially represent the associated well. This "radius" may define an area surrounding the well, or may define an area anywhere in the seismic survey. It is readily apparent that the invention is not meant to be limited to the use of a circle to define this area; any shape will do, and, in fact, depending upon the local geology, anisotropy, and other factors, at times a quite different shape from a circle would yield better results. Thus the use of the term "radius" is not meant to be limiting, but rather presents just one example of many embodiments of the within invention.) An area is defined 164, within which all seismic traces are considered to potentially represent the well. Each well can have its own area, but in one embodiment, each well has an identical area. The length of a radius defining the area is not critical as long as it is large enough to capture an adequate number of traces to represent the well in calibration. A ten-trace radius, the distance for which depends upon trace spacing, will yield approximately 300 traces to analyze and choose from for each well. This ten-trace radius has proven to be a good number, though a smaller or larger radius would work also. (Note that not all traces within the defined area need be analyzed; a subset of the traces could be analyzed with possibly some attendant loss of information.)

Each of the seismic intervals is then numbered 166 in each of the traces, as required by steps 170 and 171, within the surrounding area, and in the synthetic seismogram, relative to two interpreted surfaces which bound the study interval selected in step 106. For example, interval 1 might be the first seismic interval below the upper surface, interval 2 the second one below, etc. At least three seismic intervals are necessary with this method. This is because linear regression requires two data points to define a line, but a third or more points should be included in order to determine the goodness or quality of the fit, and to reduce the effects of random variation or noise in the data values. A difficulty arises when three correlated seismic intervals do not exist—which is not an unusual case. In such a case, one embodiment of this invention, described herein, which uses inflection-point intervals, is particularly beneficial, since frequently three or more inflection-point intervals will exist even where three or more correlated intervals do not exist.

To recap, intervals for all traces to be used in the analysis are numbered 166, 170, 171, 172, 173 and 175. The number of intervals within the study interval for each trace is then compared 176 to the number of intervals within the study interval in the synthetic seismogram. If the seismic trace has a different number of seismic intervals within the study interval than occurs within that interval in the synthetic seismogram, as checked in step 178, it is not considered to be representative of the well and is excluded 179 from further analysis. All remaining traces are then tentatively chosen 180 to be included for generating the scaling function, subject to further limitation in step 210, infra. Steps 182,184 and 186 ensure that all traces associated with a given well, which traces are desired to be considered, are considered. Steps 188 and 190 ensure that all wells desired to be considered are considered.

After this tentative choosing of traces for generating the scaling function comes the first regression analysis. In one embodiment, for each calibration attribute, the attributes extracted from each seismic interval for each real trace are regressed against the same attributes for the corresponding intervals of the synthetic seismogram as follows. For each of the chosen traces within the predetermined radius for each well, each attribute extracted from each seismic interval is regressed 192 against the same attribute for each corresponding interval in the synthetic seismogram. Steps 198, 200 and 206 ensure all desired traces, for a given well for each attribute, are considered. Steps 202, 203 and 206 ensure all wells are considered for each attribute. Steps 204, 205 and 206 ensure all desired attributes are analyzed. For example, suppose two attributes were extracted from each of three seismic intervals. Two regressions would then be performed for each trace (one per attribute), and three data points would be included in each regression analysis (one per seismic interval). Finally, correlation coefficients and regression slopes are calculated 208 for each attribute extracted from each trace.

Then, mathematical models are generated to assess the seismic-to-synthetic well tie. In one embodiment, for each attribute and all calibration wells, only those traces having calculated positive slopes (assuming that the seismic data and the synthetic seismograms are of the same polarity) and correlation coefficients exceeding a cutoff (in one embodiment, the cutoff is high, for example R>0.9 (where R is the correlation coefficient, determined in accordance with methods known by those of ordinary skill in the art), but not so high as to severely restrict the number of traces used to create the scaling model) are selected 210 for generating 116 the single linear scaling function for that attribute. Each attribute extracted from all seismic intervals in these selected traces is regressed against the same attribute extracted from the corresponding interval in the synthetic seismogram. For example, in the scenario set forth above, suppose there are four calibration wells and, for each attribute, there are ten traces selected per well, the linear models for which traces have positive slope and which traces have a correlation coefficient which exceeds the cutoff. Two scaling functions would be generated (one for each attribute), and each function would be defined using 120 data points (three intervals times four wells times ten traces per well).

Figure 3D:
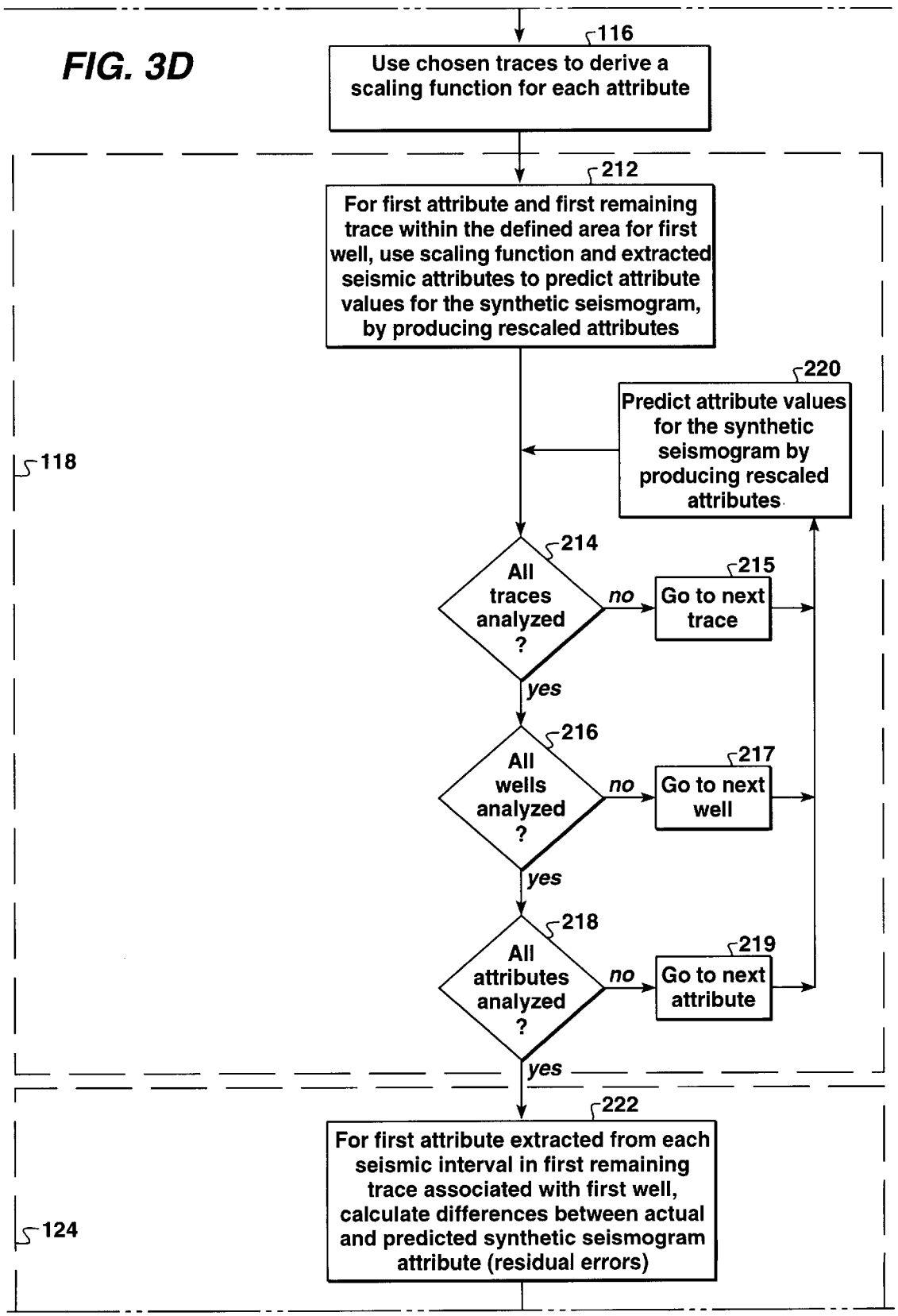

Step 118 is presented in exploded form in steps 212–220 in FIG. 3D. The seismic-to-synthetic well tie is assessed and representative traces are selected for calibration. In one embodiment, for each attribute extracted from each seismic interval in all remaining traces (i.e., those with the same number of seismic intervals as the synthetic seismogram) within the defined radius for each calibration well, the scaling function and the extracted seismic attributes are used to predict 212 values for these same attributes in the synthetic seismogram. In other words, the scaling functions are used to rescale the real trace attribute(s) to the scales of the synthetic attribute(s). Steps 214, 215 and 220 ensure all desired chosen traces are analyzed. Steps 216, 217 and 220 ensure all desired wells are analyzed. Steps 218, 219 and 220 ensure all desired attributes are analyzed.

Figure 3E:
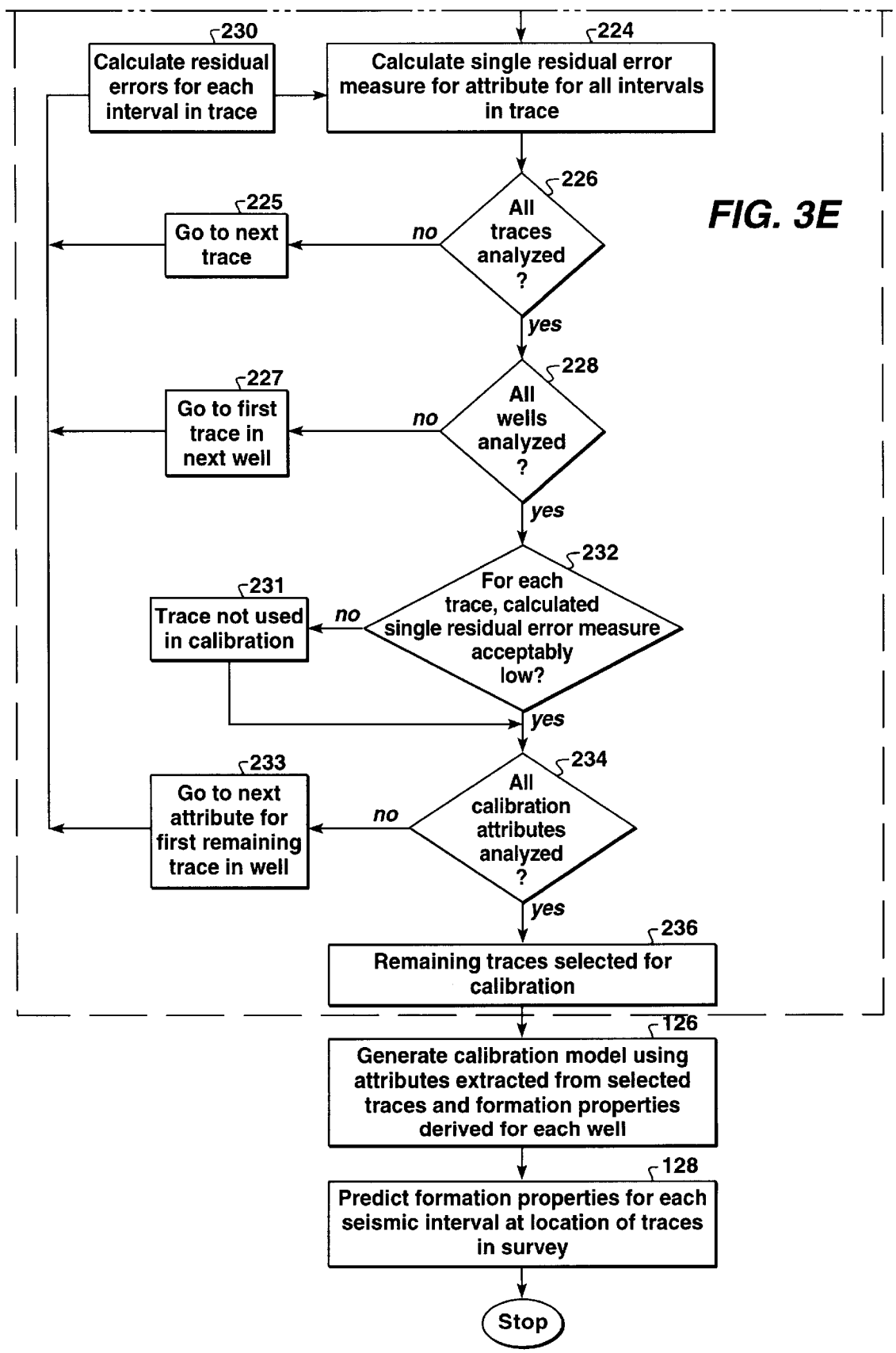

Step 124 is presented in exploded form in steps 222–236 in FIGS. 3D and 3E. Residual errors are calculated 222 for the first attribute within each seismic interval in the first remaining trace. Then, a single error specific to one of the calibration attributes is calculated 224 for each trace associated with each well. Any error function could work; in one embodiment, the error function used is the root-mean-square, as follows:

$$\text{RMS} = \left( \sum_{i=1}^{n} \frac{R_i^2}{n} \right)^{0.5} \quad (1)$$

where n=the total number of seismic intervals within the study interval; and $R_i$=the calculated residual error for seismic interval i.

Steps 226 through 230 ensure that all traces and wells are analyzed. Those traces with an RMS average residual error for a specific calibration attribute that falls above a predetermined cutoff, as set forth in step 232, are not considered representative of the well for that specific calibration attribute, and are not used 231 in calibration. Determination of the cutoff is made on a case by case basis: the lower the cutoff, the fewer the traces selected but the more similar are the traces selected to the synthetic seismogram, for that attribute. If this is the only calibration attribute, then these are the traces selected for use in calibration. If multiple attributes are used in the calibration, then in one embodiment RMS average residual errors are derived for each of the attributes, as ensured by steps 233 and 234, and those traces with RMS values below cutoffs determined for each attribute considered are those traces selected 236 for use in the calibration. If possible, selection of these cutoffs should insure that the traces used in calibration are representative of those in the entire seismic data cube and that the resultant calibration is of good quality. The quality may be defined by such criteria as prediction error, confidence limits, or other such techniques as would be apparent to those skilled in the art.

While this method can be applied using any extracted seismic attributes, preferably those extracted seismic attributes used should be identical to the attributes selected for calibration.

In one embodiment of this invention, the seismic interval chosen is the "inflection point interval," as discussed above. This embodiment is particularly effective when the average residual impedance attribute for such inflection-point intervals is used as the attribute analyzed. The average residual impedance attribute is simply an average of residual impedance within each seismic interval on the residual impedance trace, as is known to those of ordinary skill in the art. Advantages of using this embodiment are many, including (a) this attribute often correlates with physical rock properties, which is a major objective in calibration, (b) the method uses a single attribute, rather than multiple attributes, thus streamlining the method, and (c) inflection points often define multiple seismic intervals between two interpreted seismic horizons, where a minimum of three intervals are used.

Figure 6:
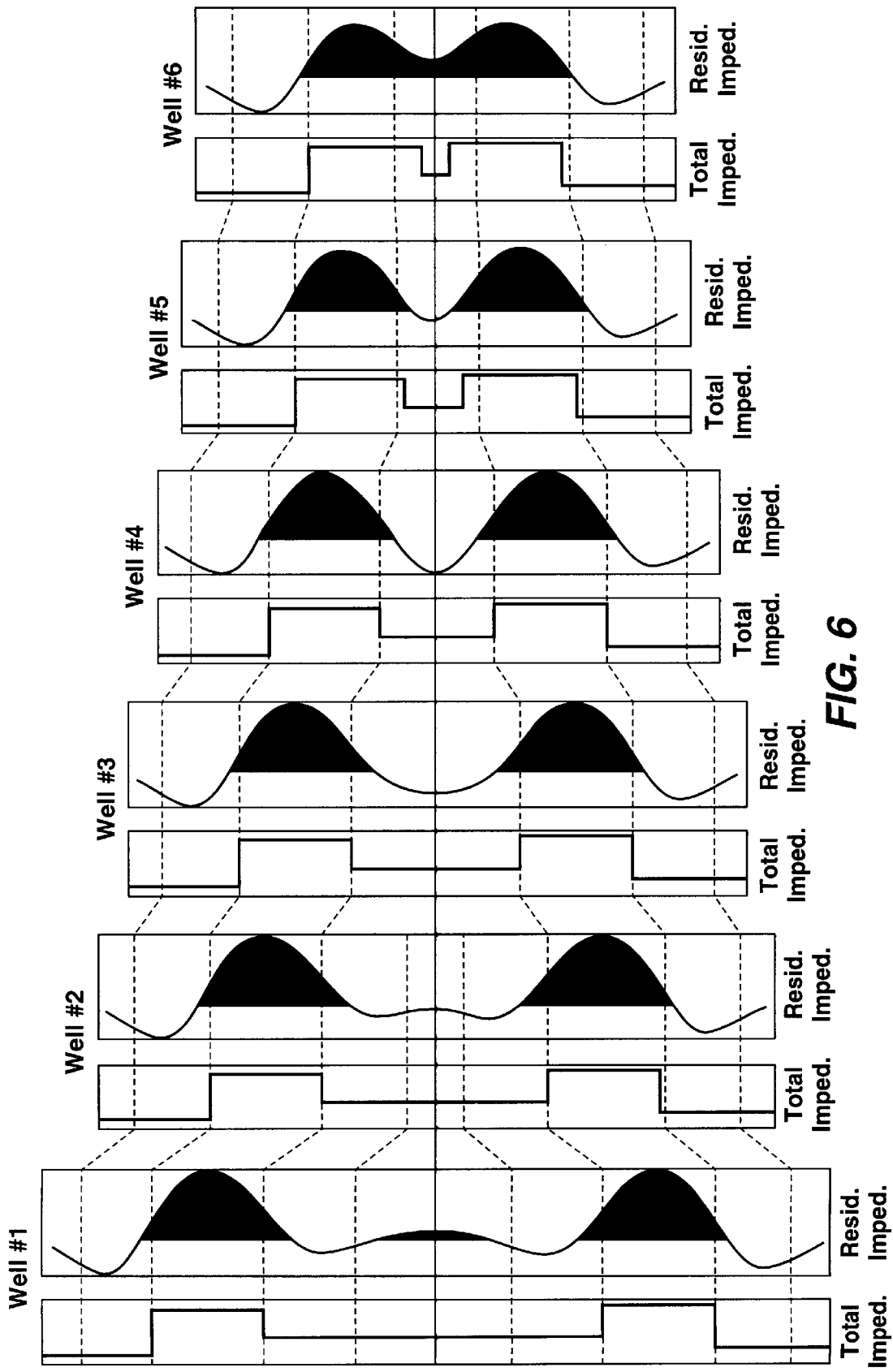
FIG. 6 depicts a synthetic wedge model in which the interval of interest thins from left to right; well log total impedance is plotted on the left and residual impedance on the right for each well. The middle interval varies in thickness from 300 feet at well 1 to 25 feet at well 6. The horizontal dashed lines mark inflection points.

Inflection-point intervals are defined as intervals bounded by inflection points on a residual impedance or total impedance seismic trace. They represent the thinnest intervals that can be detected in the seismic data, and, therefore, the thinnest intervals that can be assigned average rock properties. Inflection points are defined as the sample or interpolated sample points on a residual impedance or total impedance seismic trace where the trace curvature changes from being concave right to concave left, or vice versa. See FIG. 5B. On a zero-phase seismic amplitude trace, the local peaks and troughs also represent these points. See FIG. 5C, and local peaks and troughs in interval "A" of FIG. 4. With respect to geologic intervals, inflection points represent one of the following, as can be seen more clearly by reference to FIG. 6:

For an interval of essentially uniform impedance and with a thickness generally less than $\frac{1}{2}\lambda$ (where $\lambda$ is the wavelength of the seismic pulse) but greater than $\frac{1}{4}\lambda$, where $\frac{1}{4}\lambda$ is approximately the tuning thickness, inflection points occur at positions that bound the interval, approximately separating it from intervals of contrasting apparently uniform impedance. Average residual impedance extracted from this interval often reflects the average acoustic rock impedance, and hence the physical rock properties, within it. See, for example, wells 3 and 4 in FIG. 6.

For an interval of apparently uniform impedance, which interval is thinner than tuning thickness ($\frac{1}{4}\lambda$), inflection points will bound a larger interval that is not of apparently uniform impedance. This larger nonuniform impedance interval is at approximately tuning thickness, and average residual impedance extracted from this interval reflects the average acoustic rock impedance over the entire interval, and not just over the smaller interval of uniform impedance within it. See, for example, wells 5 and 6 in FIG. 6.

For thick intervals of apparently uniform impedance, that is, greater than $\frac{1}{2}\lambda$, inflection points will occur at the bounding surfaces and within the interval itself. The latter inflection points do not represent internal surfaces of contrasting impedance, but rather are a secondary product of the reflection of acoustic waves at each bounding surface, that is, the side lobes on the seismic pulse. Therefore, multiple inflection-point intervals occur within this apparently uniform interval, each having essentially identical average acoustic rock impedance, but slightly different average residual impedance. This generally results in a small error in calibration, for example, often less than one porosity unit. See, for example, wells 1 and 2 in FIG. 6.

Once the inflection-point intervals have been identified and attributes corresponding to those intervals have been extracted, four steps are involved in converting these attributes to rock properties.

First, the inflection-point interval rock properties are captured 108 for each inflection point interval (see FIG. 1). One way to accomplish this is to find the location of the inflection points in depth, using the synthetic seismogram derived in 104, then determine the desired rock properties within each inflection-point interval.

In one embodiment, the first step for accomplishing the capture of inflection-point interval average rock properties is to select calibration wells in the survey area 102. Then, if necessary, well logs for those wells are edited 154 to insure accuracy of the synthetic seismograms associated with each well. One synthetic seismogram for each well is then generated 104 using techniques known to those of ordinary skill in the art. It is helpful for the synthetic seismograms to accurately represent the impedance character at the well within the seismic interval of interest. Then, from the well log synthetic seismograms, the inflection points are located on each seismic trace (by locating the change in curvature from positive to negative on said one residual impedance or total impedance seismic trace, or by locating minima and maxima on a zero-phase amplitude trace; see FIG. 5), and inflection-point intervals are identified in depth. This involves converting travel time to depth at each inflection point using methods familiar to those skilled in the art. Finally, in each well, the rock properties of interest must then be derived for each inflection-point interval within the study interval of interest, as described above.

Second, the seismic traces representing each calibration well are selected, preferably using the technique described above and as set forth in the flowchart in FIG. 3, steps 164 through 236.

Third, the seismic attributes are calibrated to rock properties 126 (FIGS. 1, 2B, or 3E). In one embodiment, the inflection-point interval attribute or attributes of choice are extracted from each inflection-point interval within the study interval of interest, for all selected traces representing each well, a step which would be accomplished already if the method as set forth above and in the flowchart in FIGS. 3A, 3B, 3C, 3D, and 3E were being followed. Then, a calibration is performed by scaling the extracted inflection-point interval attribute or attributes to the measured average rock properties by using techniques, such as linear regression, that are known to those skilled in the art. The validity of the assumptions inherent in the method of scaling, e.g., linearity, must be verified, and the attribute range for the calibration data set should be similar to, and in one embodiment span at least 90% of, this same range for all traces in the 3D seismic data set.

Finally, the model is applied to the seismic data cube 128. In one embodiment, the model is applied to the entire seismic data set, transforming the extracted inflection-point interval attribute or attributes to the rock properties of interest. This is done preferably for all inflection-point intervals within the study interval for all seismic traces in the data set; however, using fewer than all can give acceptable results as well.

One method of formation property prediction involves selecting traces using the technique disclosed at the outset and set forth in FIG. 3 in steps 164 through 236, and calibrating using the inflection-point-interval average residual-impedance attribute, which often has a direct relationship to average physical rock properties. The statistical method selected for calibration will be dependent on the data and on the objectives of the seismic attribute analysis. For example, if a linear relationship between the attribute and the corresponding rock property is verified, then linear regression can be used. If the relationship is shown to be curvilinear, however, a curvilinear model should be chosen. If the attributes are calibrated with a class variable, for example, lithology, then discriminant function analysis, as would be known to one skilled in the art of mathematics, might be the method of choice.

EXAMPLE 1

Figure 8:
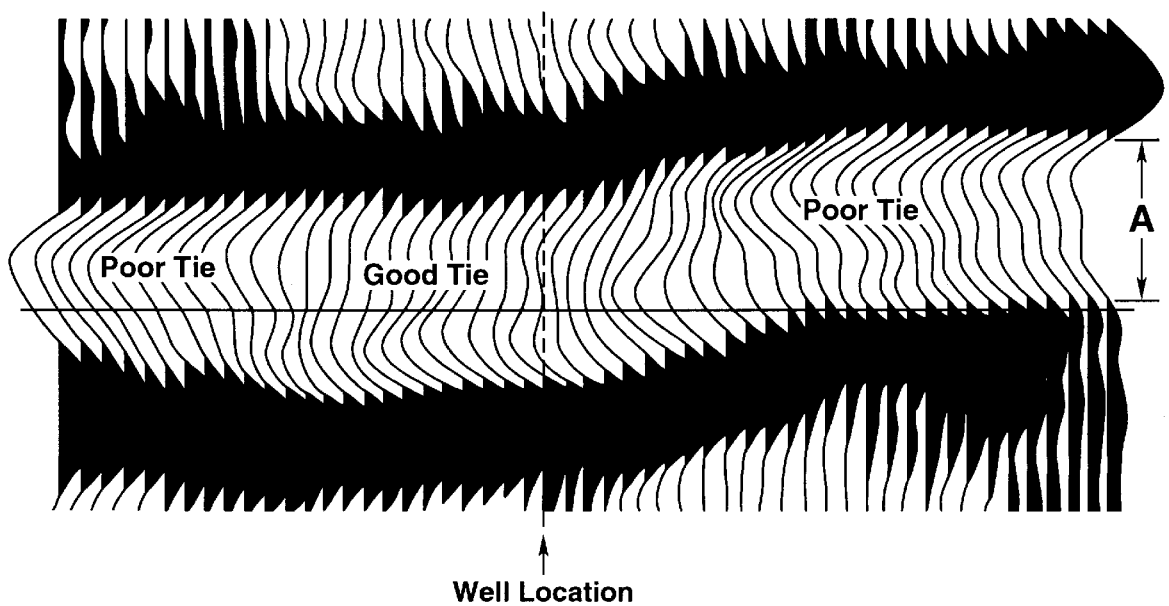
FIG. 8 depicts a residual-impedance seismic section through the well in FIG. 7.

In the following example involving a carbonate reservoir, the average residual impedance attribute extracted from inflection-point intervals within and immediately above seismic interval "A" in FIG. 8 was used to select representative traces for calibration. The objective of this study was to estimate porosity within interval "A" by calibrating inflection-point interval average porosities to this average residual-impedance attribute. For ease of understanding of the steps taken in this EXAMPLE, step numbers corresponding to the flowcharts of FIGS. 1, 2, and/or 3 are set forth where appropriate.

Figure 7:
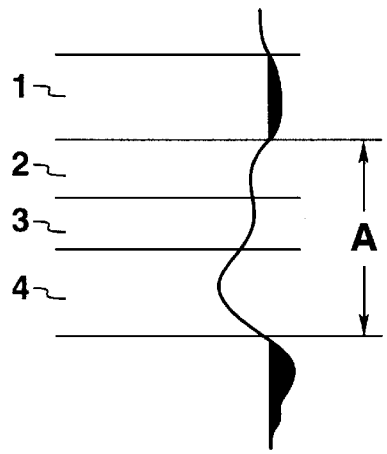
FIG. 7 depicts a residual-impedance synthetic seismogram for a calibration well for EXAMPLE 1.

The desirable seismic traces were selected using the method set forth above. Specifically, 15 calibration wells were chosen within the survey area 102, of which four were ultimately eliminated due to poor-quality seismic data in proximity to these wells, as discussed below. The well logs were then edited 154, to ensure that the sonic and density logs were complete, i.e., containing no gaps, and contained no spurious data due to poor hole conditions, etc. After editing of the well logs 154, synthetic seismograms were generated for each of the wells 104. These synthetic seismograms were produced as residual-impedance traces. For these synthetic traces, the average residual-impedance attribute was then extracted 107 from each inflection-point interval within study interval "A" 106, as well as from the inflection-point interval immediately above interval "A." See FIG. 7. Each inflection-point interval was numbered 166 as follows: the interval above the upper interpreted surface was labeled number one, the first below this surface was labeled number two, etc. Inflection-point interval one was included in this analysis to extend the range in the values of average residual impedance, and thus improve the regression.

The inflection-point attribute file for the seismic data was then generated. For each real trace within a ten-trace (approximately 1100 feet) radius 164 of each calibration well, the average residual-impedance attribute was extracted 107 from an integrated 3D seismic cube over a window which included interval "A" and the inflection-point interval above it. As was done for the synthetic seismogram, each inflection-point interval used in this analysis was numbered in the same manner. To do this, the surfaces bounding interval "A" had to be interpreted at every trace. Where the seismic trace being analyzed had other than three inflection-point intervals within interpreted interval "A," (all calibration synthetic seismograms in this EXAMPLE have three inflection point intervals within interval "A") that trace was not considered to be representative of the well and was excluded from further analysis; the remaining traces were chosen 178, 180 for further analysis. For example, the first trace on the left hand side of the seismic section shown in FIG. 8 has only one inflection-point interval within interval "A," rather than the three expected. Thus, had this trace been within the ten-trace radius of a calibration well, it would have been excluded from further analysis.

The real versus the synthetic average residual impedance attribute extracted from all four inflection point intervals was then regressed for each trace 192. That is, for each chosen trace within the relevant radius of a well, the average residual impedance attribute extracted from each inflection-point interval was regressed against the average residual impedance attribute from the corresponding interval in the synthetic seismogram. For each of these remaining traces, correlation coefficients and slopes of the linear fit were calculated 208.

Figure 9:
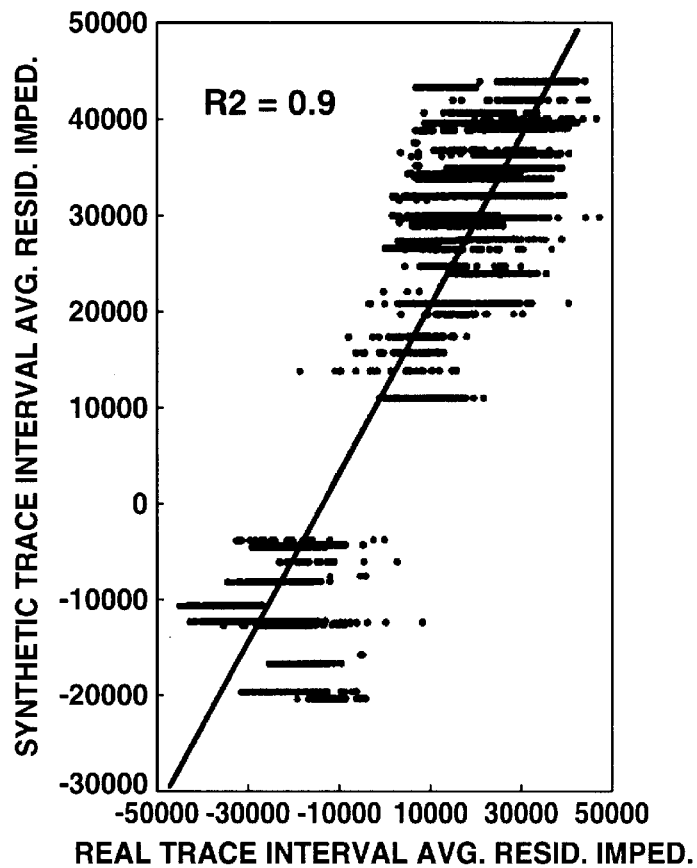
FIG. 9 is a graph of the model used to rescale the real seismic-trace inflection-point interval average residual impedance (the selected calibration attribute for this study) to the scale of the synthetic seismogram inflection-point interval average residual impedance attribute.

After this regression, a function was generated to re-scale the real trace attribute to the same scale as the synthetic seismogram attribute 116. Those traces having calculated positive slopes (seismic polarity is identical for both the real traces and the synthetic seismograms in this EXAMPLE) and R exceeding 0.9 (as set forth in step 210) were used in generating the single linear function for re-scaling the real trace attribute to the same scale as the synthetic seismogram 116. See FIG. 9. In this FIGURE, notice those data points at negative values of average residual impedance. These points are from inflection-point interval one, and were included in this analysis to extend the range of the data on this plot, and thus improve the regression.

After the model was generated, the seismic-to-synthetic well tie was assessed and representative traces selected, as follows. For each of the three inflection-point intervals within interpreted interval "A" for all traces (although fewer than all could have been used) within the defined radius of each well (excluding those with a different number of inflection-point intervals than occur in the synthetic seismogram, as described above), the extracted average residual impedance attribute and the linear scaling function set forth in FIG. 9 were used to predict a value for this attribute in the synthetic seismogram 212. A residual error was then calculated for that attribute within each of these inflection point intervals 222. Although it could have been done, in this EXAMPLE a value was not calculated for inflection-point interval one because it is not included in interval "A." A single RMS average residual error was then calculated for each trace 224 using Equation (1) above, where n=3 since three intervals were used in the analysis. Those traces with an RMS average residual error below 4500 (the tenth percentile in this EXAMPLE) were considered 232 to be representative of the well and were used 236 in the calibration. This cutoff value was chosen because it provided for a reasonably good correlation between average residual impedance and porosity, as explained below, and the average residual impedance attribute values extracted from intervals within these selected traces span a range covering 90% of the total range extracted from the seismic data cube.

Figure 10:
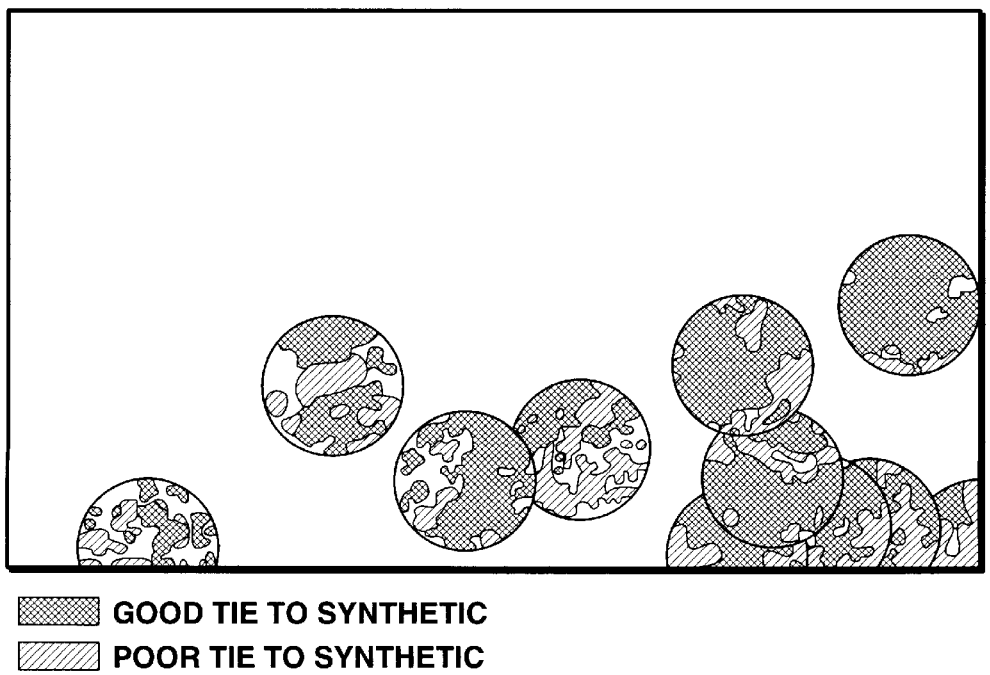
FIG. 10 is a map of RMS average residual error for traces within a ten-trace radius of each calibration well for EXAMPLE 1. The rectangular boundary on this FIGURE is approximately the limit of the 3D seismic survey.

FIG. 10 is a map of the calculated RMS residual errors for this case study. The circle around each well has a radius of ten traces. The blank areas in each circle are at locations of traces which were omitted because their number of inflection-point intervals differs from that of the synthetic seismogram corresponding to their well. In this study, it was determined that changes in the RMS residual error around any well are largely due to variation in geology; specifically, in the vertical distribution of porosity within interval "A." In addition, some of the areas with poor ties seen in FIG. 10 represent poor-quality seismic traces. In fact, as stated earlier, four wells of the eastern margin of this survey, which wells are not shown in FIG. 10, were deleted from the calibration data set because all of the traces within 1100 feet of these wells were of poor data quality due to the decreasing fold typical of the edge of a survey. This trace selection method yielded very high RMS residual errors for these traces, not always because the extracted attributes did not correlate well with the corresponding synthetic attributes, but also because, for those which did correlate well, the linear regression for the individual traces at the edge of the survey were very different, that is, exhibited a different linear scaling function, from the single model representing the entire 3D seismic data set. See FIG. 9.

Figure 11B:
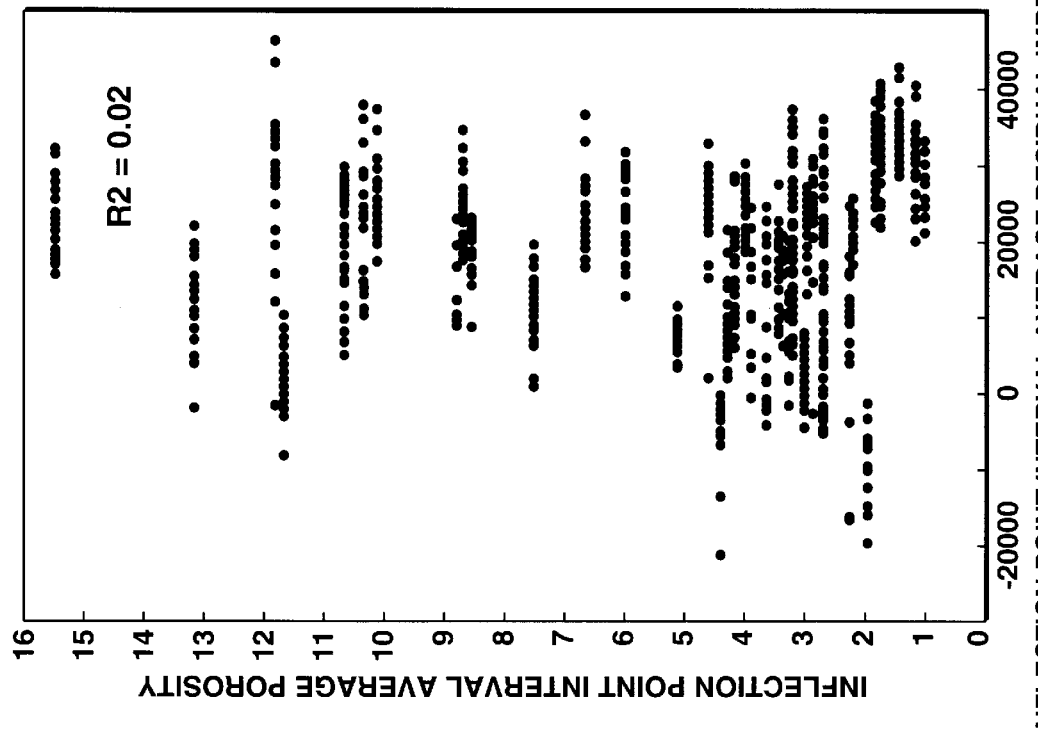
FIGS. 11A and 11B show cross plots of inflection-point interval average porosity with inflection-point interval average residual impedance for EXAMPLE 1.
Figure 11A:
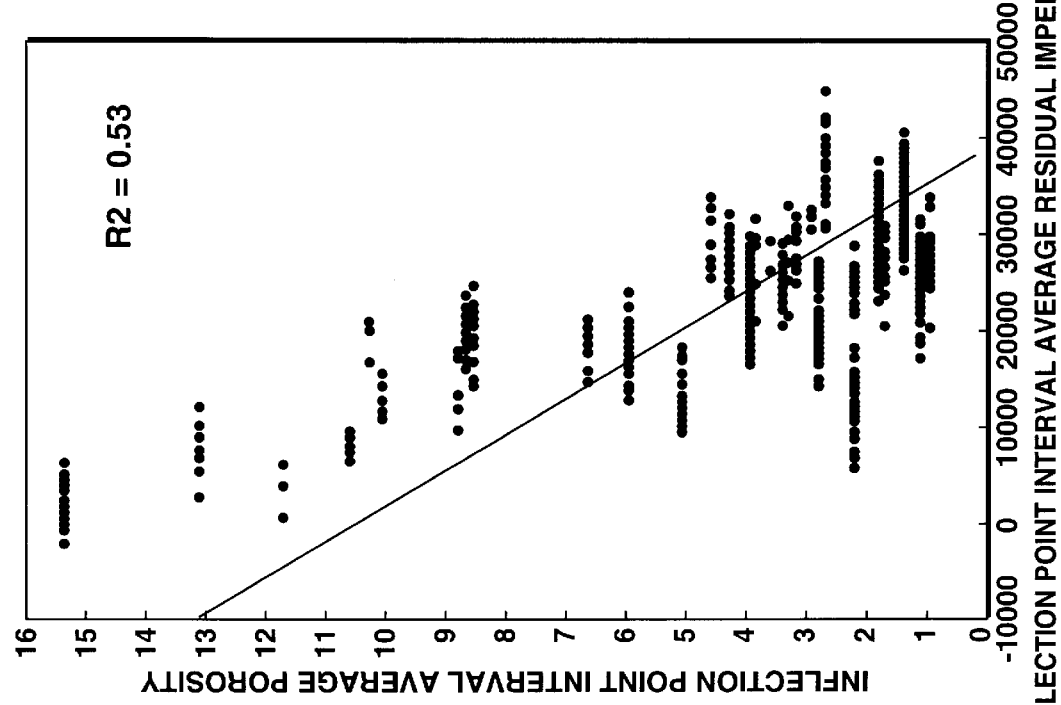

For those data sets which have geologic variability and/or variability in seismic data quality in close proximity to calibration wells, as was the case in this EXAMPLE, selecting traces based on well proximity alone, as in the relevant prior art, would likely have resulted in poor or no calibration of seismic attributes to rock properties. FIG. 11A is a cross plot of the inflection-point interval average porosity versus the inflection-point interval average residual impedance attribute within interval "A," for those traces selected using the trace selection method disclosed herein. FIG. 11B is a cross plot of these same variables for traces selected based on their proximity to the well alone (in this case, a three-trace radius). The linear model plotted in FIG. 11A is that used to transform the inflection-point interval average residual impedance attribute to inflection-point interval average porosity within interval "A," for the entire seismic data cube (the calibration model). No such model is plotted in FIG. 11B because these data do not correlate at all; therefore, if traces were selected based on well proximity alone, no linear calibration model using the average residual impedance attribute could have been derived from this data set.

EXAMPLE 2

In this EXAMPLE, the benefits of performing a seismic-attribute analysis using inflection-point interval attributes are explored. The survey data set used, and the interval focused upon, are the same as those in EXAMPLE 1. The inflection-point interval average residual impedance attribute associated with seismic interval "A" in FIG. 4 was used to estimate porosity in this interval throughout the entire 3D seismic data cube. To demonstrate the clear advantages of applying this method over more conventional ones, an additional calibration was performed. For this comparison, the broad methodology described above was applied, except that a single average residual-impedance attribute was extracted from the entire interpreted interval "A," rather than from each inflection-point interval. For ease of understanding of the steps taken in this EXAMPLE, step numbers corresponding to the flowcharts of FIGS. 1, 2, and/or 3 are set forth where appropriate.

The first step performed was to calibrate inflection-point interval average rock properties. In this example, there were 15 wells 102 in the survey area. Due to poor data as set forth above, ultimately 11 wells in the survey area were used in the calibration. The well logs were edited to ensure the accuracy of the synthetic seismograms 154. The inflection points on each trace were identified from the well log synthetic seismograms, and inflection-point intervals were identified. Then, for each well, the average total porosity (derived from the sonic log calibrated to core porosity measurements) was derived for each inflection-point interval within study interval "A" 108. For the comparison study, porosity was averaged over the entire interval "A," as said interval was identified by the synthetic seismograms.

The same seismic traces that were selected in EXAMPLE 1 above were used in this example to represent each calibration well. It should be noted, however, that the method for selecting traces outlined in FIG. 3 could not have been applied in this EXAMPLE if attributes had been extracted from the entire interval "A" rather than from inflection point intervals, since, at minimum, three seismic intervals are required and, in this study, only by using inflection-point intervals is this requirement satisfied. The average residual impedance was extracted from each inflection-point interval within interval "A" or from the entire interval "A" for each of these traces.

Figure 12B:
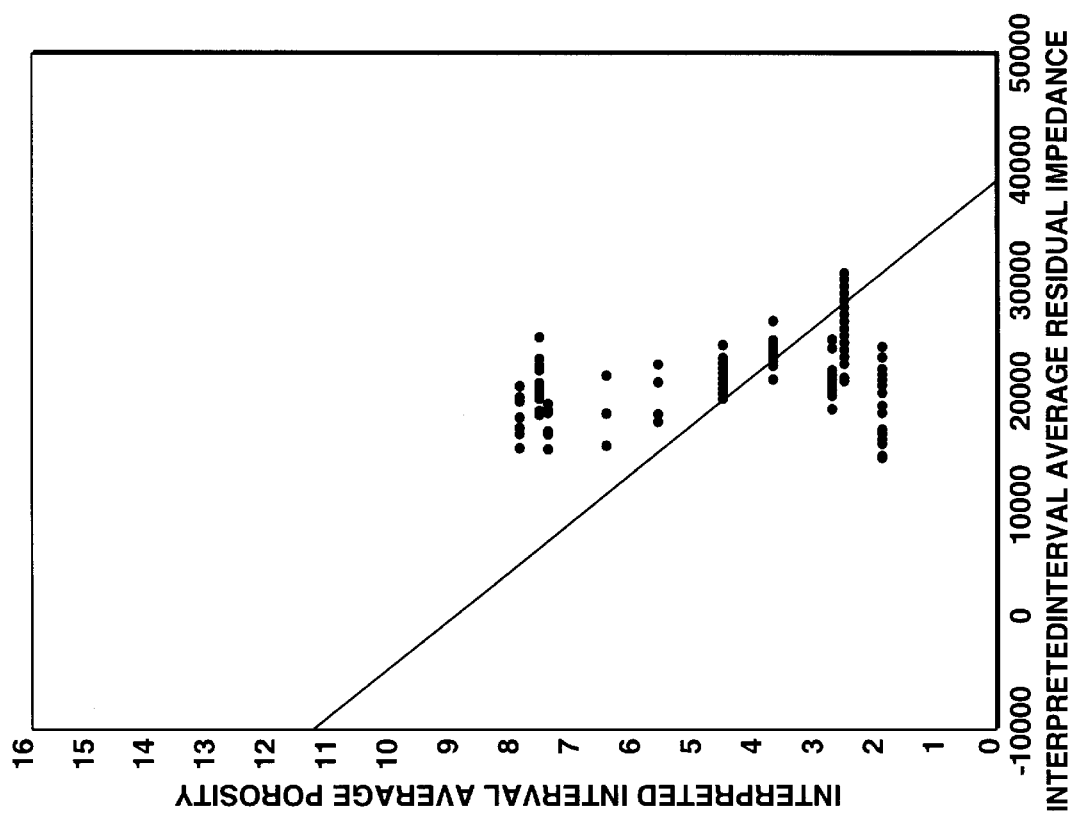
FIG. 12B is a cross plot of interpreted interval "A" average porosity versus interpreted interval "A" average residual impedance. The linear regression line in each FIGURE is the model used to predict porosity in the seismic data cube.

The seismic attributes were then calibrated to rock properties as follows. First, the rock properties derived from each inflection-point interval in each well were paired with inflection-point interval average residual impedance attribute extracted from corresponding intervals in the selected traces. A calibration was then performed by regressing the extracted inflection-point interval average residual impedance attribute against the measured inflection-point interval average porosity using linear regression 126. The range in attribute values for the resulting linear model (FIG. 12A) spans approximately 90% of the total range for this attribute in the entire 3D seismic data cube. Note that for the comparison this same attribute extracted from the entire interval "A" was calibrated 126 with porosity averaged over the entire interval "A," and the resulting model is shown in FIG. 12B.

Figure 12A:
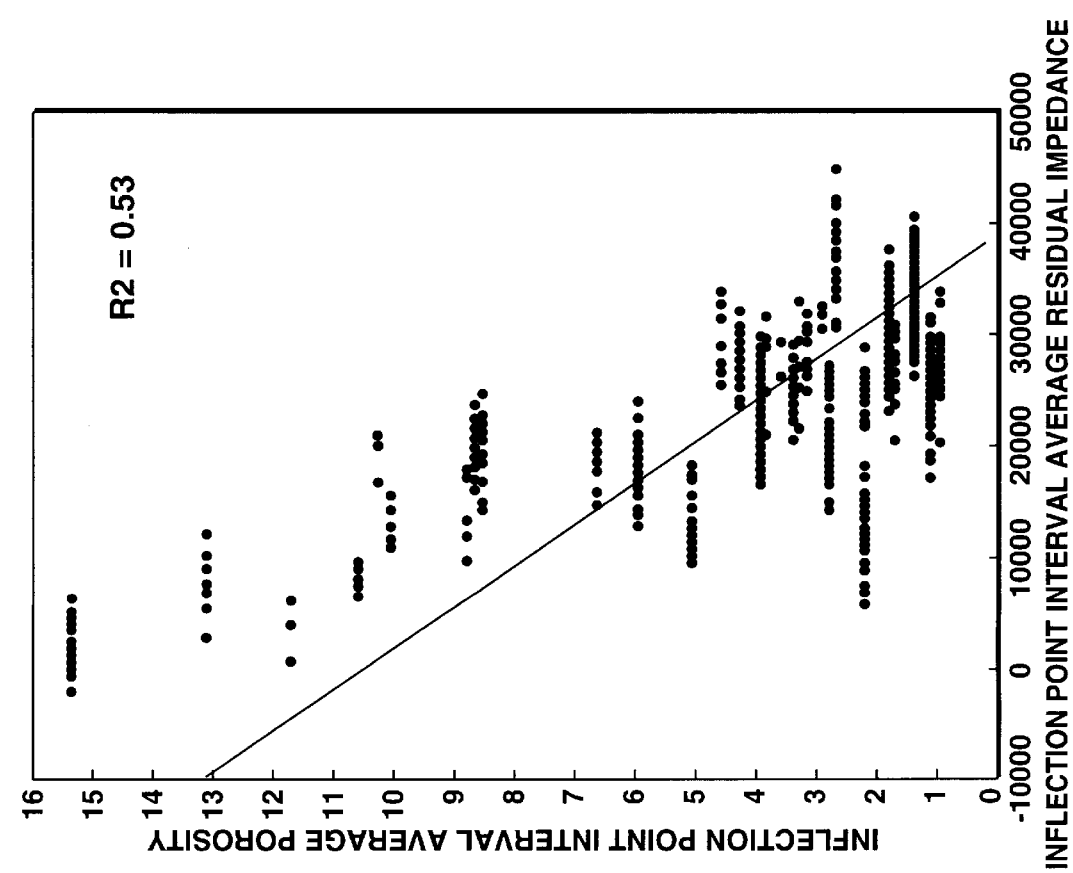
FIG. 12A depicts a cross plot of the inflection-point interval average porosity versus inflection-point interval-average residual impedance for EXAMPLE 2. Similarly.

The model shown in FIG. 12A was then applied to the entire seismic data set, transforming the extracted inflection-point interval average residual impedance attribute to average porosity 128. This was done for all inflection-point intervals within the study interval in the data set. Note that for the comparison study in FIG. 12B, the respective model was applied to the entire seismic data set, transforming the extracted attribute to average porosity. This was done for the entire interpreted interval "A."

Figure 13:
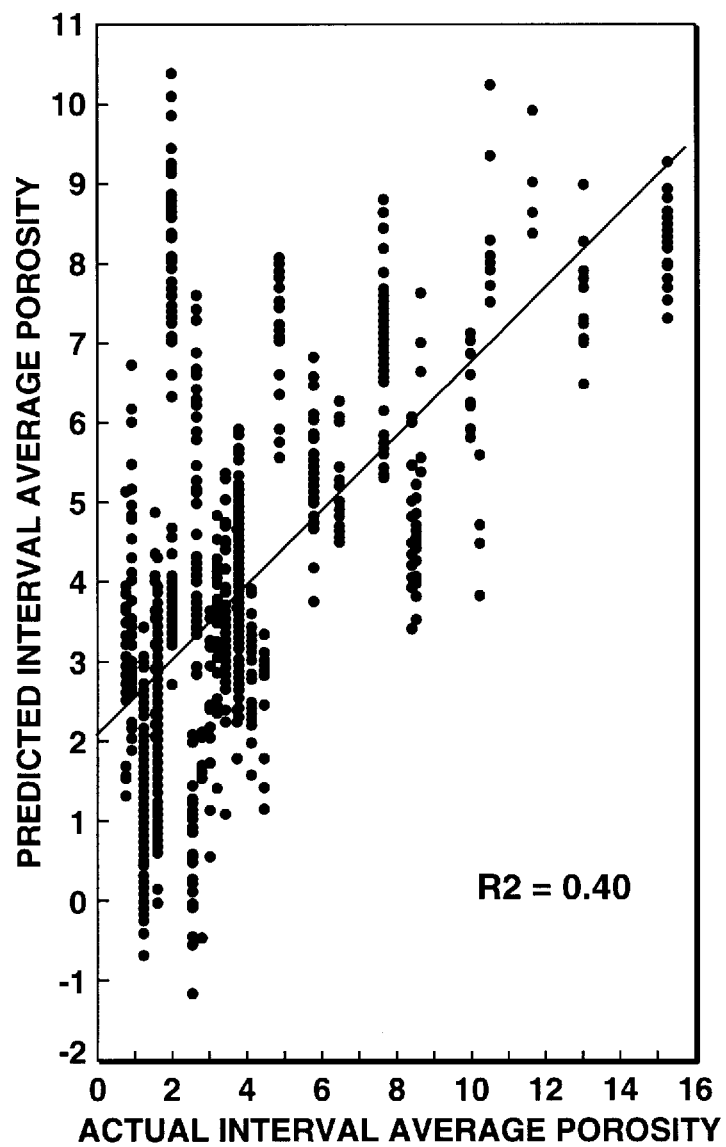
FIG. 13 depicts the predicted versus the actual average porosity values for inflection-point intervals in the calibration wells for EXAMPLE 2. A cross validation technique, a standard procedure in the art, and optionally used for the within invention, was used in preparing FIG. 13. The cross validation technique derives a model using all but one calibration well, then checks how well the model predicts characteristics of the removed well. This is repeated, each time removing a different calibration well.

To test the accuracy of this inflection-point interval attribute extraction and calibration method, a standard cross validation procedure was applied, which involved removing one calibration well from the entire calibration data set, and generating a regression model using data from the remaining wells. The model was then applied to the traces selected to represent the well that was removed, in order to predict average inflection-point interval porosities in this well, and to compare these predictions to the actual average interval porosities. This process was repeated several times, removing a different calibration well each time, until predictions were made for each calibration well. As can be seen in FIG. 13, porosities were predicted fairly accurately, although they are slightly overestimated at the low end and somewhat underestimated at the high end. This error results from using standard linear regression to define the model. Notice, in FIG. 12A, that the linear model does not pass through data points at the low and particularly the high porosity ends of this cross plot. Though a different answer would result if the linear model had been forced through the extreme data points represented in this FIGURE, it cannot be proven that this new model would necessarily have resulted in more accurate porosity predictions.

Results of the predictions are shown in both map and cross section view in FIGS. 14A through 14D, 15A, and 15B. Because, if using the inflection-point interval attribute to predict porosity, multiple porosity values are calculated at each trace (one for each inflection-point interval within interval "A"), the following calculation must be applied to generate a map of interval "A" average porosity:

$$\text{porosity} = \left( \sum_{i=1}^{n} P_i * T_i \right) / T_t, \quad (2)$$

where porosity is the average porosity over the entire seismically interpreted interval "A" at any trace; $P_i$ is the porosity at inflection-point interval i (for this trace, there are n inflection-point intervals within the seismically interpreted interval); $T_i$ is the thickness in time of the inflection-point interval i; and $T_t$ is the sum of time thickness over all n inflection-point intervals, $$\sum_{i=1}^{n} T_i.$$

Figure 14A:
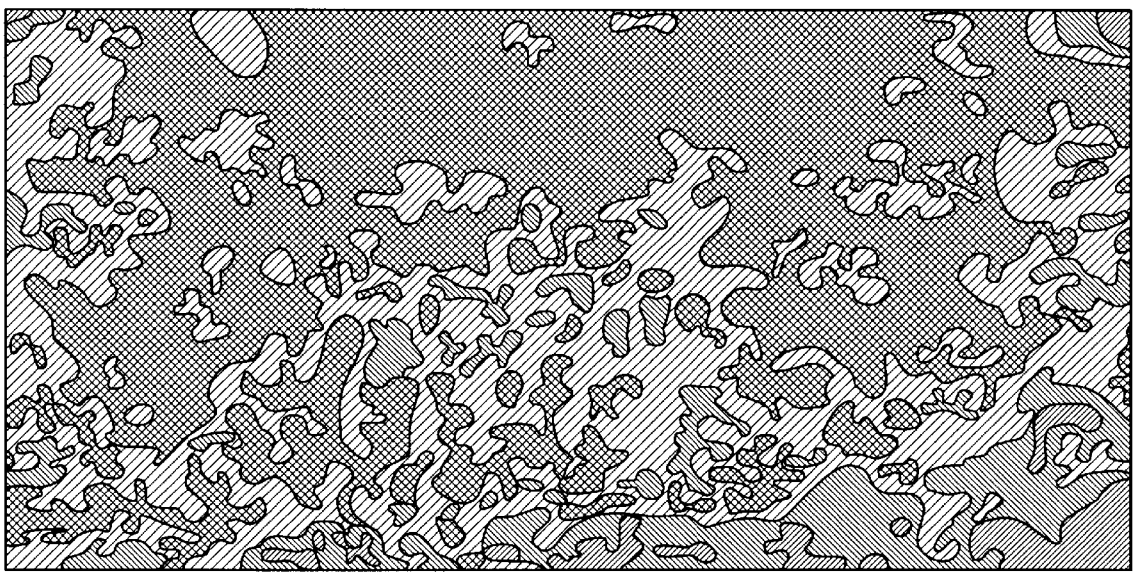
FIG. 14A depicts a map of predicted average porosity within interval "A" of EXAMPLE 2, using inflection-point interval average residual impedance to predict porosity. Similarly.
Figure 14B:
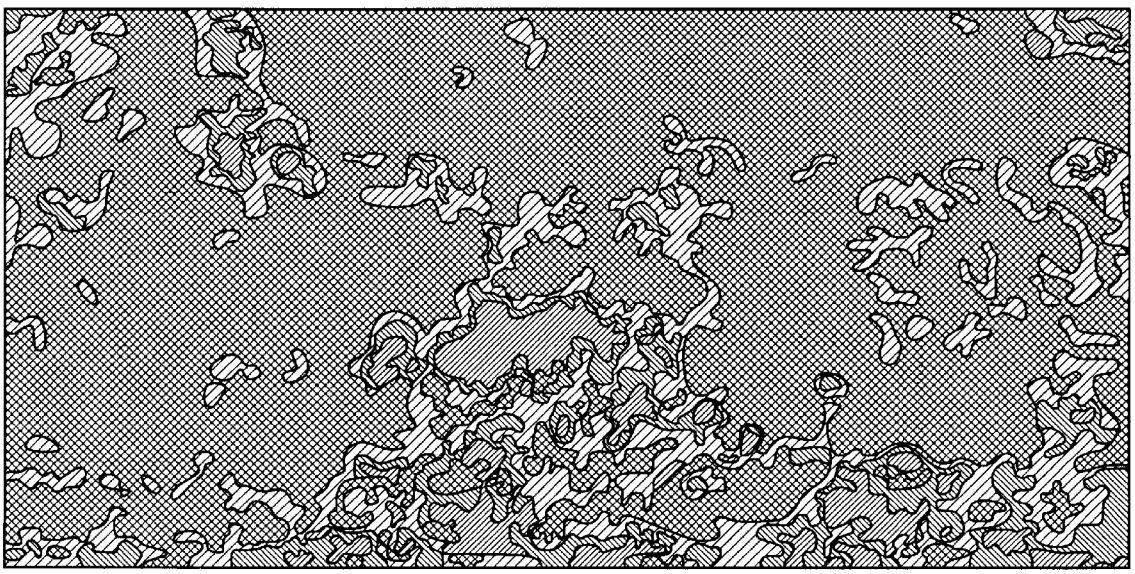
FIGS. 14B, 14C and 14D are maps of, respectively, predicted average porosity within the uppermost inflection-point interval at any seismic trace, within the lowermost inflection-point interval, and within interval "A" using the average residual impedance attribute for the total interpreted interval.
Figure 14C:
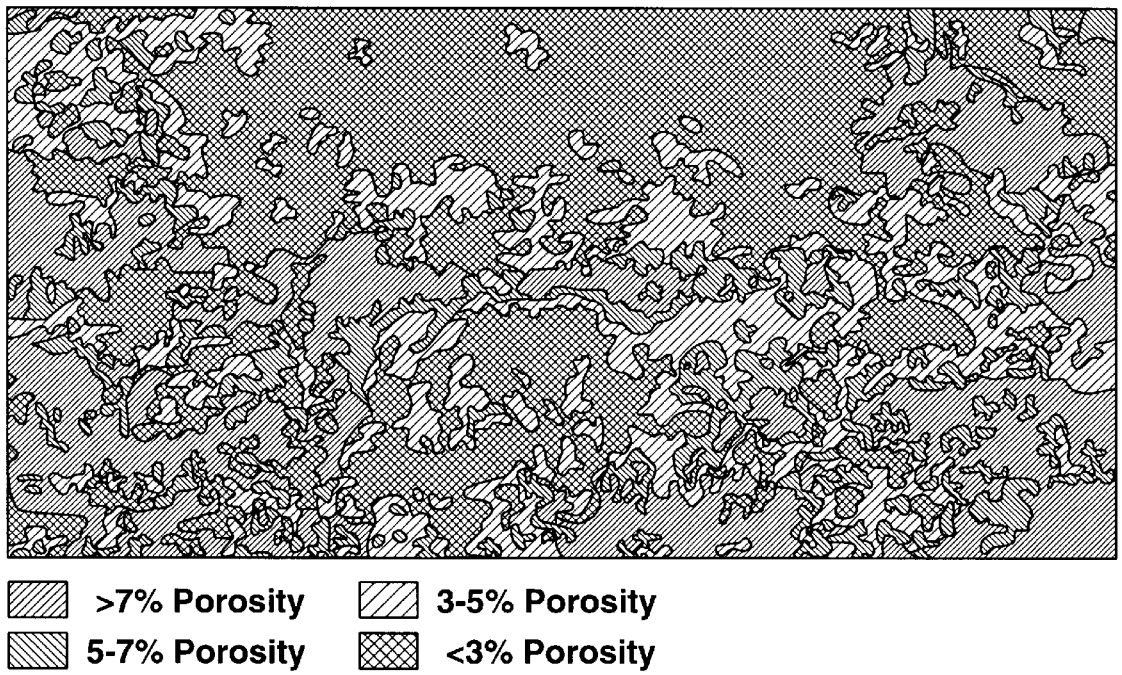
Figure 14D:
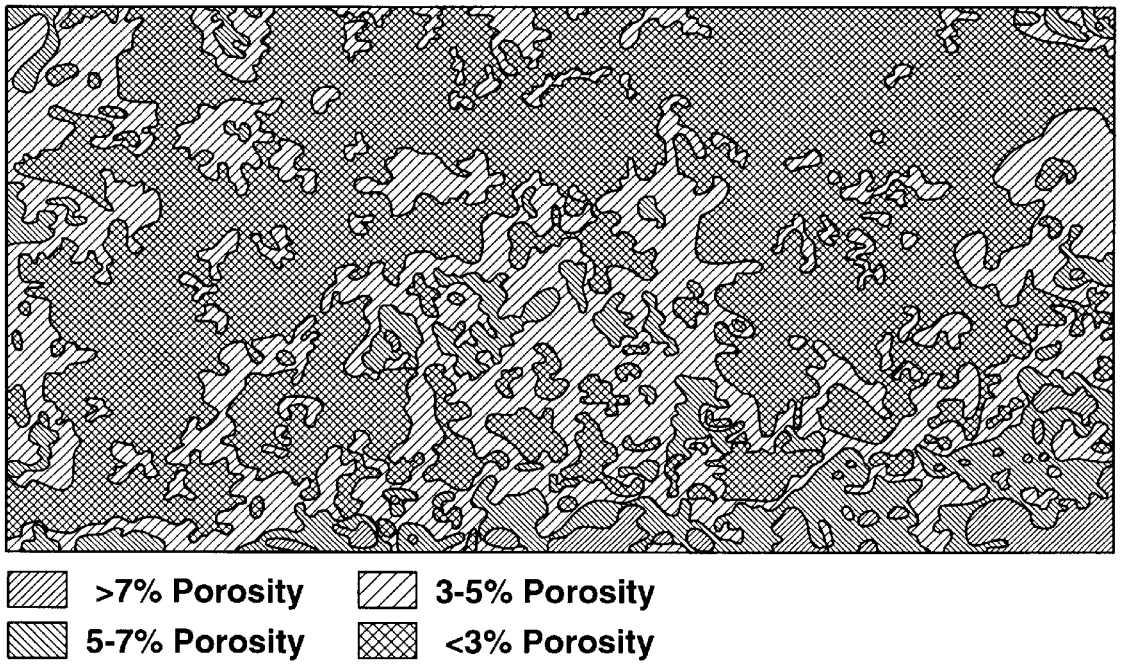

FIG. 14A is a predicted average porosity map for interval "A." FIG. 14B is a predicted average porosity map for this interval, but uses average porosity values predicted for only the uppermost inflection-point interval at any trace. This should represent porosity in the uppermost part of the interpreted seismic interval. FIG. 14C is similar to 14B, except that it represents the lowermost inflection-point interval. Using inflection-point interval attributes in calibration allows one not only to make maps of the predicted average interpreted interval rock property, but also to make maps that indicate the vertical distribution of this rock property within the interval. Data in FIGS. 14A, 14B, and 14C were generated using the calibration model in FIG. 12A. FIG. 14D is a map of predicted average porosity within interval "A," derived using the average residual impedance attribute extracted over the entire interpreted interval (calibration model in FIG. 12B).

Figure 15A:
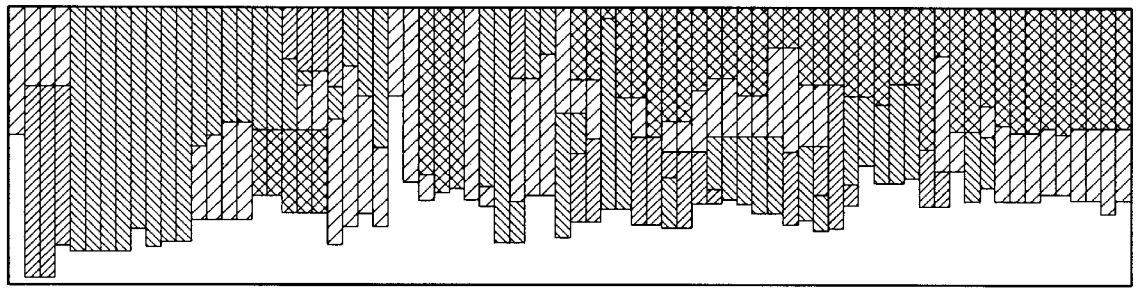
FIG. 15A depicts the predicted average porosity for EXAMPLE 2 in cross sectional view using the inflection-point average residual impedance, where each bar is an inflection-point interval at a trace. Similarly.

FIG. 15A represents average porosity values predicted along a cross section of interpreted interval "A" in this map area. In this FIGURE, each vertical bar represents an inflection-point interval, with the width being the trace spacing (110 feet in this example) and the length being the time-thickness of the interval.

Figure 16B:
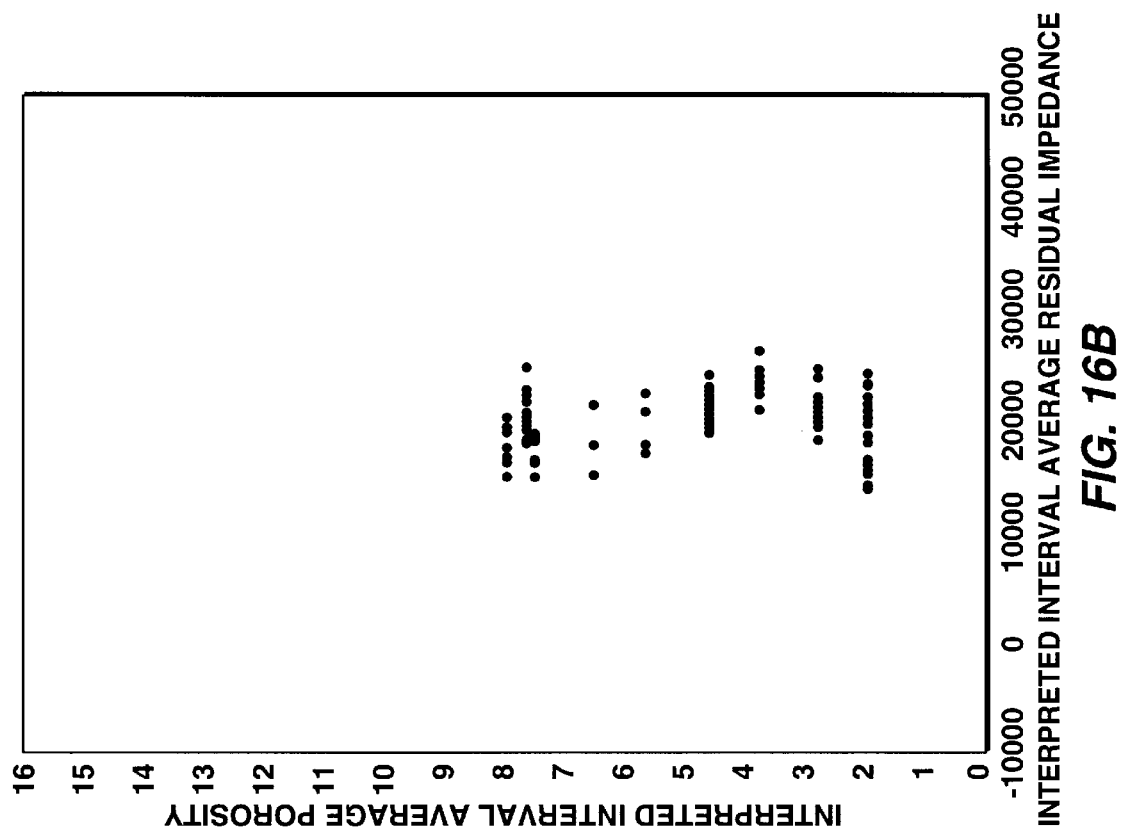
FIGS. 16A and 16B correspond to the cross plots in FIGS. 12A and 12B respectively, with one of the 11 calibration wells removed.
Figure 16A:
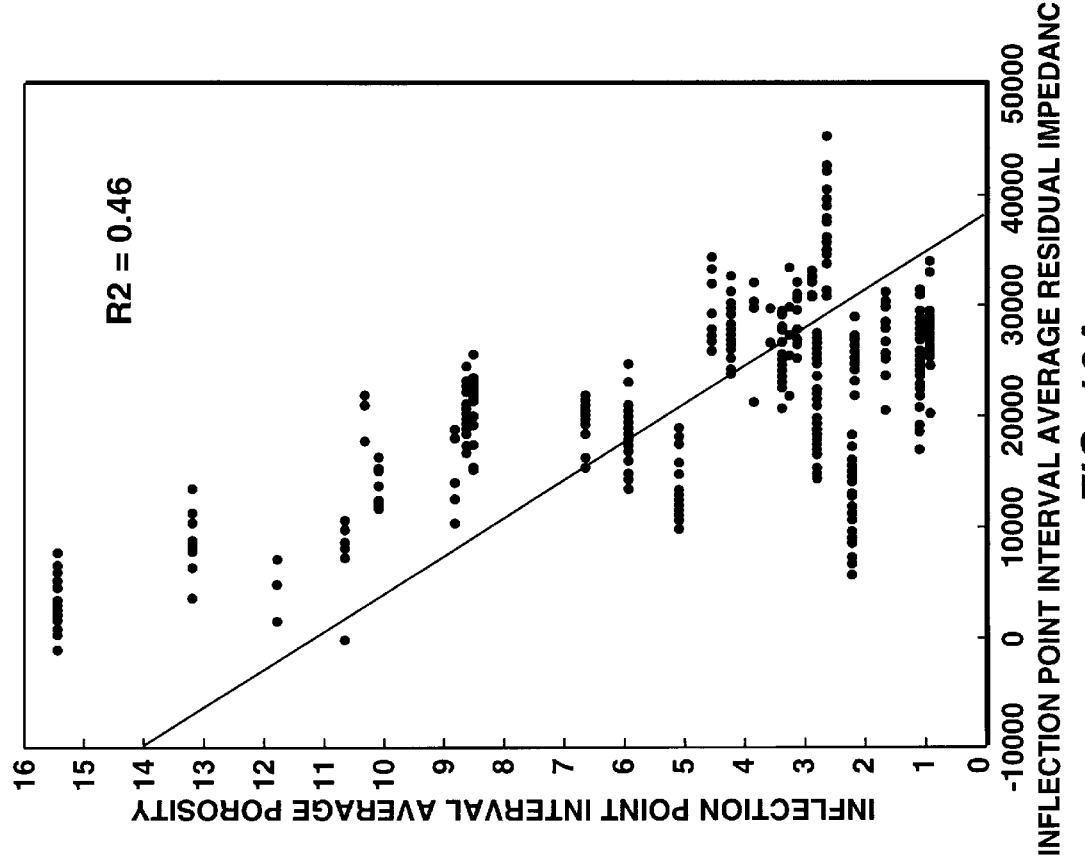

The use of this EXAMPLE 2 underscores at least two advantages of using the inflection-point interval attribute extraction and calibration method, as follows:

1. There is greater confidence in the calibration model. In comparing FIG. 12A and 12B, it is noticed that, when averaging data over inflection-point intervals, the range of interval average porosity values is expanded beyond that which is obtained when averaging over the entire interpreted interval "A." This extended range results in increased correlation coefficients in this EXAMPLE and greater confidence in these correlations, particularly when extrapolating the model to extreme values. In FIGS. 16A and 16B, these calibration models are recalculated after removing just one of the eleven calibration wells from the calibration data set. One can see that the model derived using the inflection-point interval average residual impedance is nearly unaffected by removal of the data for this well, while the model derived using a single average residual impedance attribute extracted over the entire interpreted interval "A" is significantly affected, and, in fact, cannot be derived due to the lack of any significant correlation.

This difference is due to both the extended range and increased number of data points that result when calibrating using inflection-point interval attributes.

Figure 15B:
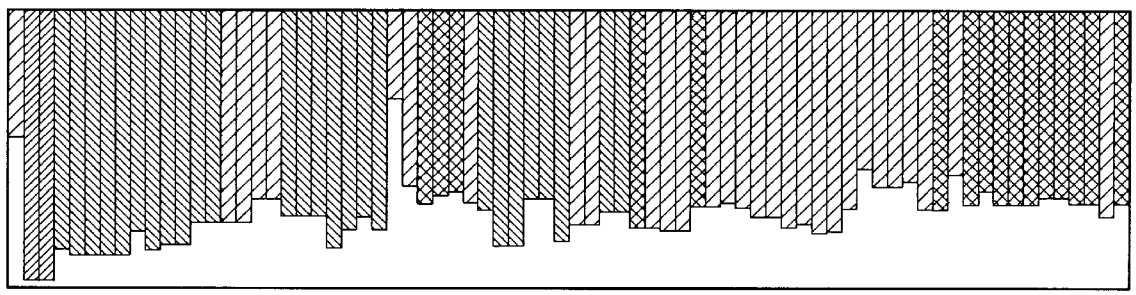
FIG. 15B depicts the predicted average porosity for EXAMPLE 2 in cross sectional view using interpreted interval "A" average residual impedance. The datum is the top of interval "A." The location of this section is posted on the maps in FIGS. 14A, 14B, 14C and 14D; its starting point is in the north central part of the study area.

2. There is improved vertical resolution in the predictions. See FIG. 15A, where multiple porosity intervals are derived for each trace within interpreted interval "A." The vertical resolution of the predictions is controlled by the bandwidth of the seismic data. FIG. 15B is an identical cross section, except that it shows the single predicted average porosity value derived for interpreted interval "A," using the single average residual impedance attribute extracted from this interval. Using this latter, more conventional approach, the internal surfaces of contrasting porosity are not identified, and the vertical distribution of this porosity seen in FIG. 15A goes unrecognized. In this case, the vertical resolution of the prediction is controlled by the thickness of the interpreted interval "A". However, average porosity values calculated over the entire interpreted interval "A" are very similar using both methods, as can be seen by comparing FIGS. 14A and 14D.

Persons skilled in the art will understand that the method for selecting traces and/or for accounting for local surfaces described herein is not to be unduly limited to the foregoing which has been set forth for illustrative purposes. Various modifications and alternatives will be apparent to those skilled in the art without departing from the true scope of the invention, as defined in the following claims.

What is claimed is:

1. In a method of seismic attribute analysis of a set of seismic data traces, a method for dividing a designated study interval into a plurality of thinner seismic intervals, said method comprising the steps of:

locating inflection points on the portions of said seismic data traces falling within said designated study interval;

for each of said seismic data traces, designating the seismic intervals between consecutive inflection points as inflection point intervals; and using said inflection point intervals in performing said seismic attribute analysis.

2. The method of claim 1, wherein said seismic data traces are residual impedance data traces and wherein said inflection points are points on said residual impedance data traces where the curvature changes (a) from concave left to concave right and (b) from concave right to concave left, when said residual impedance data traces are oriented in a generally vertical position.

3. The method of claim 1, wherein said seismic data traces are total impedance data traces and wherein said inflection points are points on said total impedance data traces where the curvature changes (a) from concave left to concave right and (b) from concave right to concave left, when said total impedance data traces are oriented in a generally vertical position.

4. The method of claim 1, wherein said seismic data traces are zero phase seismic amplitude traces and wherein the local peaks and local troughs on said zero phase seismic amplitude traces represent said inflection points.

5. A method for characterizing the subsurface properties of a designated subsurface formation through seismic attribute analysis of a set of seismic data traces, said method comprising the steps of:

defining a study interval on said seismic data traces, said study interval corresponding to said designated subsurface formation;

locating inflection points on the portions of said seismic data traces falling within said study interval and designating the seismic intervals between consecutive inflection points as inflection point intervals;

selecting a seismic attribute that correlates with said subsurface properties;

determining the value of said seismic attribute for each of said inflection point intervals; and using said seismic attribute values for said inflection point intervals to characterize said subsurface properties of said designated subsurface formation.

6. The method of claim 5, wherein said seismic data traces are residual impedance data traces and wherein said inflection points are points on said residual impedance data traces where the curvature changes (a) from concave left to concave right and (b) from concave right to concave left.

7. The method of claim 6, wherein said seismic attribute is the average residual impedance attribute.

8. The method of claim 5, wherein said seismic data traces are total impedance data traces and wherein said inflection points are points on said total impedance data traces where the curvature changes (a) from concave left to concave right and (b) from concave right to concave left.

9. The method of claim 5, wherein said seismic data traces are zero phase seismic amplitude traces and wherein the local peaks and local troughs on said zero phase seismic amplitude traces represent said inflection points.

* * * * *